United States Patent
Chen et al.

(10) Patent No.: US 9,658,430 B2
(45) Date of Patent: May 23, 2017

(54) OPTICAL IMAGING LENS AND ELECTRONIC DEVICE COMPRISING THE SAME

(71) Applicants: Yanbin Chen, Taichung (TW); Long Ye, Taichung (TW); Feng Chen, Taichung (TW)

(72) Inventors: Yanbin Chen, Taichung (TW); Long Ye, Taichung (TW); Feng Chen, Taichung (TW)

(73) Assignee: Genius Electronic Optical Co., Ltd., Taichung (TW)

( * ) Notice: Subject to any disclaimer, the term of this patent is extended or adjusted under 35 U.S.C. 154(b) by 55 days.

(21) Appl. No.: 14/598,229

(22) Filed: Jan. 16, 2015

(65) Prior Publication Data

US 2016/0116704 A1  Apr. 28, 2016

(30) Foreign Application Priority Data

Oct. 24, 2014 (CN) .......................... 2014 1 0582232

(51) Int. Cl.
| | |
|---|---|
| *G02B 9/34* | (2006.01) |
| *G02B 9/58* | (2006.01) |
| *H04N 5/225* | (2006.01) |
| *G02B 13/00* | (2006.01) |

(52) U.S. Cl.
CPC ................ *G02B 9/34* (2013.01); *G02B 9/58* (2013.01); *G02B 13/004* (2013.01); *H04N 5/2252* (2013.01); *H04N 5/2253* (2013.01); *H04N 5/2254* (2013.01)

(58) Field of Classification Search
CPC ... G02B 9/00; G02B 9/34; G02B 9/36; G02B 9/58; G02B 13/00; G02B 13/001; G02B 13/0015; G02B 13/002; G02B 13/004; G02B 13/008
See application file for complete search history.

(56) References Cited

U.S. PATENT DOCUMENTS

| | | | | |
|---|---|---|---|---|
| 5,305,148 A * | 4/1994 | Ikemori | ............... | G02B 15/177 359/689 |
| 6,717,748 B2 * | 4/2004 | Sato | ......................... | G02B 9/34 359/740 |
| 7,139,132 B2 * | 11/2006 | Itoh | ...................... | G02B 15/177 359/691 |
| 7,403,341 B2 * | 7/2008 | Watanabe | ............ | G02B 15/177 359/691 |
| 8,089,698 B1 * | 1/2012 | Tang | ...................... | G02B 13/04 359/644 |

(Continued)

*Primary Examiner* — Thong Nguyen
(74) *Attorney, Agent, or Firm* — Winston Hsu; Scott Margo

(57) ABSTRACT

An optical imaging lens includes: a first, second, third and fourth lens element, the first lens element has negative refractive power, the second lens element has an image-side surface with a concave part in a vicinity of the optical axis, the third lens element has positive refractive power, and has an object-side surface with a convex part in a vicinity of the optical axis, the fourth lens element has an image-side surface with a concave part in a vicinity of the optical axis, where the optical imaging lens set does not include any lens element with refractive power other than said first, second, third and fourth lens elements.

18 Claims, 32 Drawing Sheets

(56) References Cited

U.S. PATENT DOCUMENTS

| | | | | |
|---|---|---|---|---|
| 8,274,593 B2* | 9/2012 | Chen | .................... | G02B 13/004 |
| | | | | 348/335 |
| 9,332,181 B1* | 5/2016 | Marason | ............ | H04N 5/23238 |
| 2009/0059392 A1* | 3/2009 | Sano | ........................ | G02B 9/34 |
| | | | | 359/715 |
| 2011/0242683 A1* | 10/2011 | Yamakawa | ............ | G02B 13/04 |
| | | | | 359/715 |

* cited by examiner

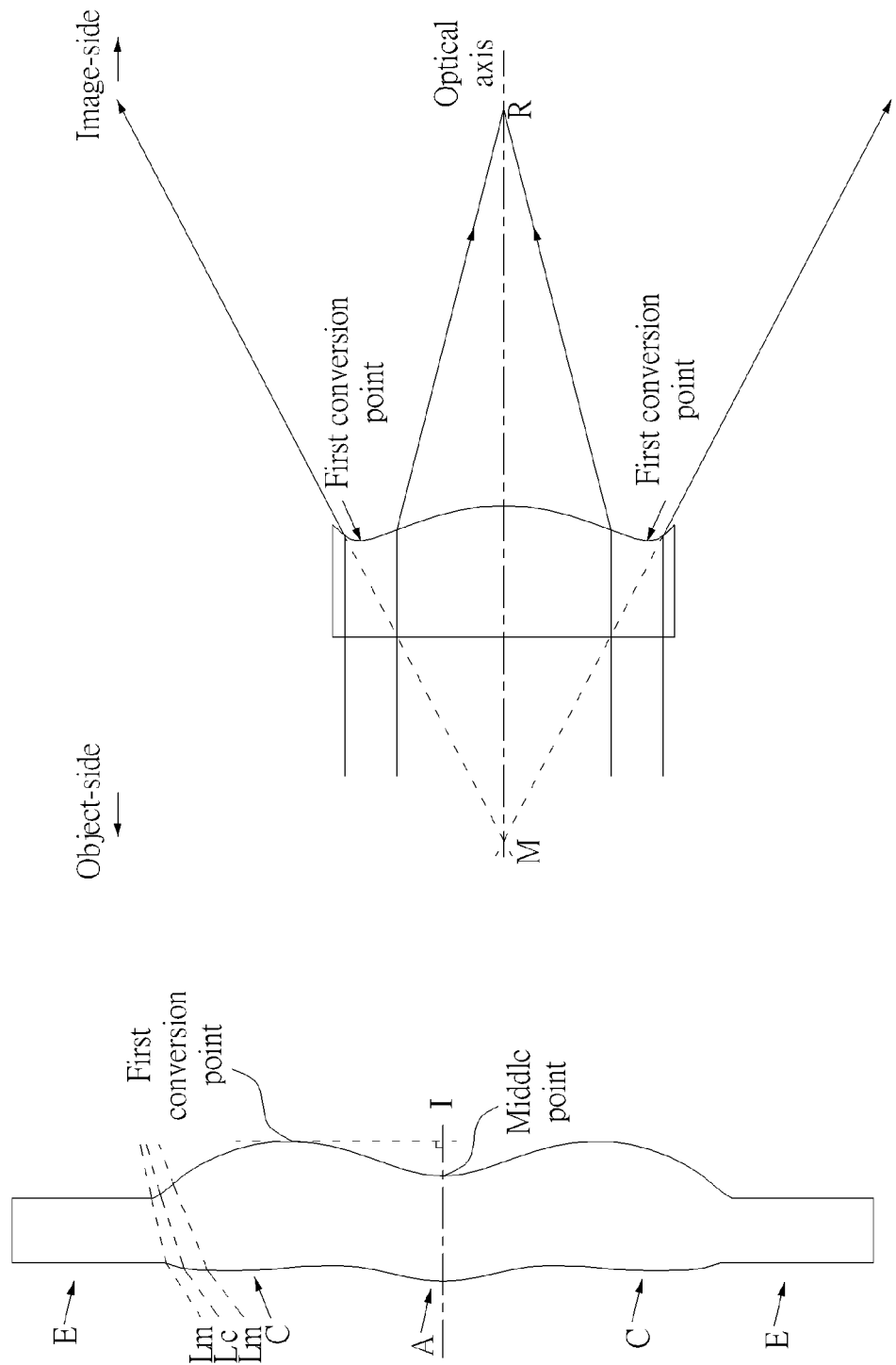

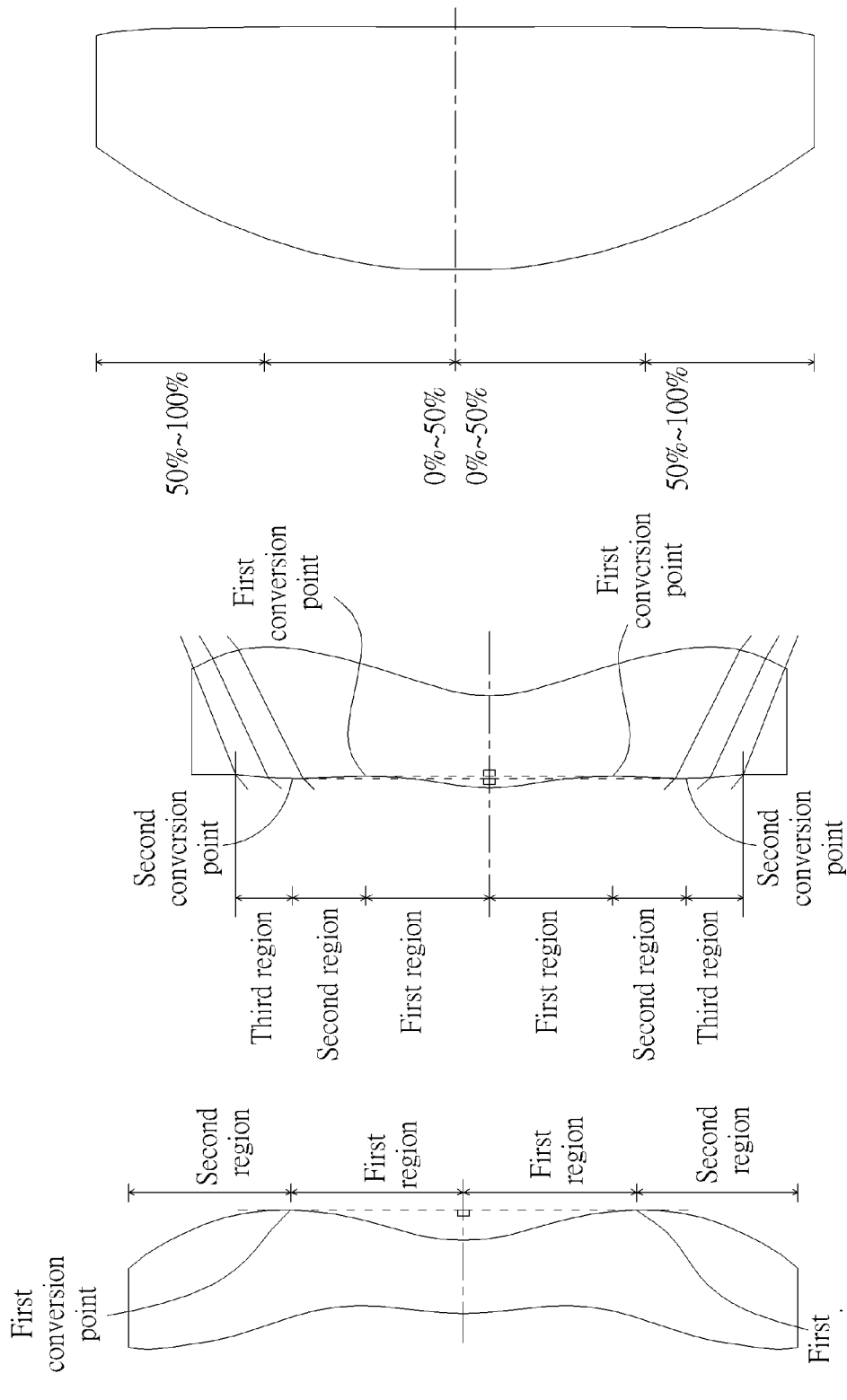

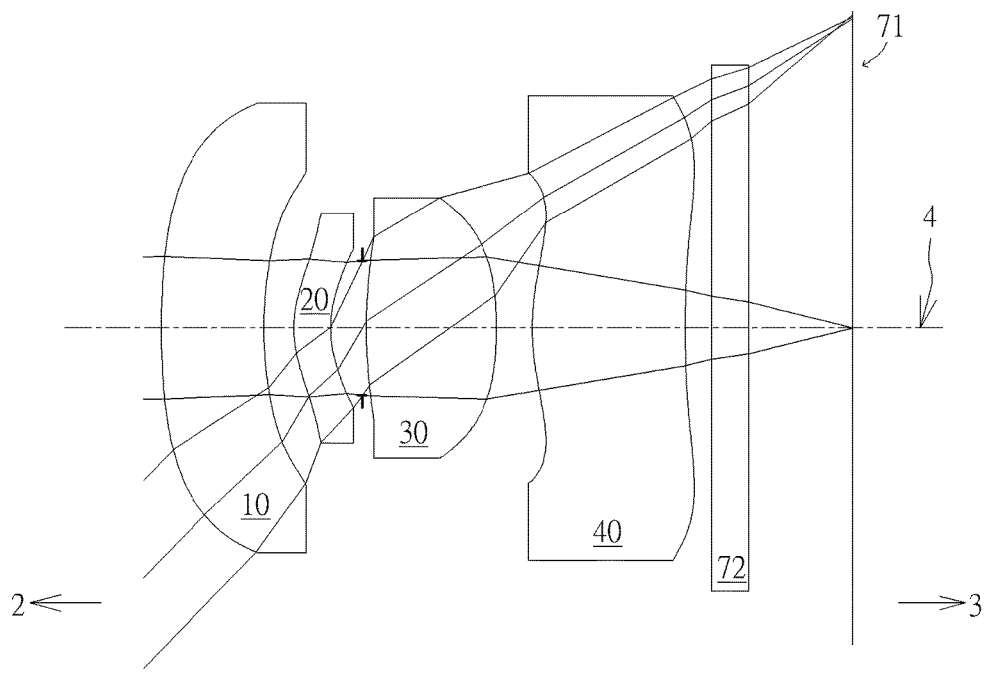
FIG. 8
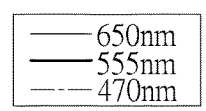
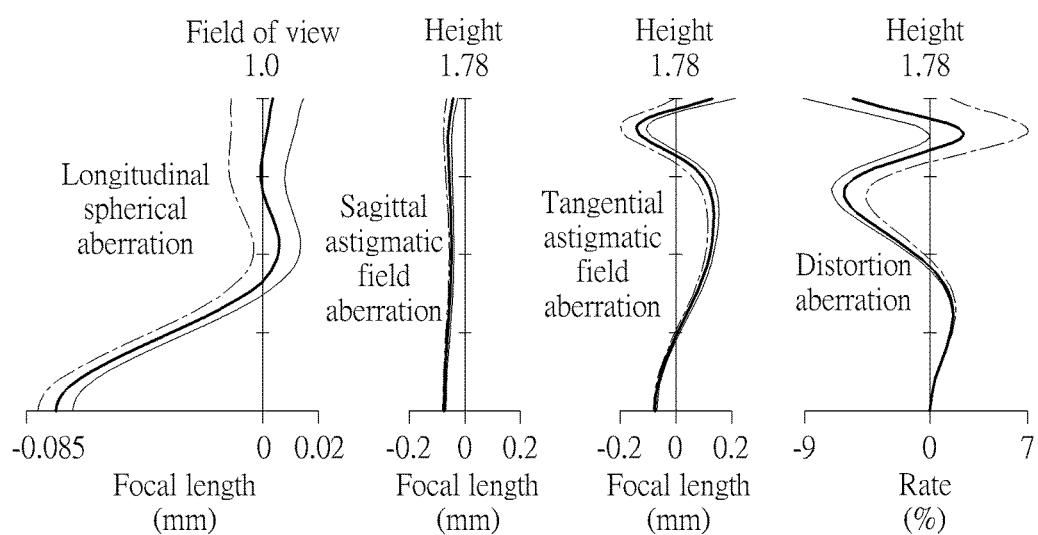
FIG. 9A    FIG. 9B    FIG. 9C    FIG. 9D

| First Example |||||||
|---|---|---|---|---|---|---|
| EFL(Effective Focal Length)= 1.71 mm., HFOV(Half Field Of View)= 46 deg., Total length=4.00mm., Fno= 2.0 |||||||
| No. | | Curvature Radius | Ape. Stop Distance Lens Thickness Air Gap | Refractive Index | Abbe Surface No. | Focal Length | Material |
| | Object | Infinity | 0.1 | | | | |
| 11 | First Lens | 7.896277656 | 0.570910986 | 1.650405349 | 21.66664999 | -4.32387 | Plastic |
| 12 | | 2.014627332 | 0.057896563 | | | | |
| 21 | Second Lens | 0.712129367 | 0.301962811 | 1.531884673 | 55.98225682 | 16.76300 | Plastic |
| 22 | | 0.66 | 0.24728796 | | | | |
| 80 | Ape. Stop | Infinity | 0.021017934 | | | | |
| 31 | Third Lens | 2.6 | 0.889230158 | 1.53504875 | 55.71236184 | 2.16503 | Plastic |
| 32 | | -1.840159633 | 0.277040404 | | | | |
| 41 | Fourth Lens | 0.826711322 | 0.301825853 | 1.531129578 | 55.74414132 | 2.87102 | Plastic |
| 42 | | 1.576948405 | 0.293844505 | | | | |
| 72 | Filter | Infinity | 0.21 | 1.516800035 | 64.16733624 | | |
| | | Infinity | 0.829207936 | | | | |
| 71 | Image Plane | Infinity | | | | | |

FIG. 26

| Surface No. | K | a2 | a4 | a6 | a8 |
|---|---|---|---|---|---|
| 11 | 0.000000E+00 | 0.000000E+00 | 1.403925E-01 | -4.455672E-02 | 8.381307E-03 |
| 12 | 2.408454E+00 | 0.000000E+00 | -2.803605E-01 | 1.119334E+00 | -4.369843E+00 |
| 21 | -3.628299E+00 | 0.000000E+00 | 3.658211E-01 | -4.244913E+00 | 1.069716E+01 |
| 22 | 0.000000E+00 | 0.000000E+00 | -1.328504E-01 | -1.378039E+01 | 1.213671E+02 |
| 31 | -2.639256E+01 | 0.000000E+00 | -5.324083E-02 | 2.342757E-01 | 3.380441E+00 |
| 32 | 0.000000E+00 | 0.000000E+00 | -9.292602E-01 | 1.978251E+00 | -3.486351E+00 |
| 41 | -4.974012E+00 | 0.000000E+00 | 2.314804E-02 | -2.069258E-01 | 1.624054E-01 |
| 42 | 0.000000E+00 | 0.000000E+00 | 2.464955E-02 | -4.721607E-01 | 4.829770E-01 |

| Surface No. | a10 | a12 | a14 | a16 |
|---|---|---|---|---|
| 11 | 1.722626E-02 | -6.274532E-03 | -9.518140E-04 | 1.091276E-03 |
| 12 | 1.152376E+01 | -1.683627E+01 | 1.231690E+01 | -3.451328E+00 |
| 21 | -9.310849E+00 | -8.778700E+00 | 2.715414E+01 | -1.751417E+01 |
| 22 | -5.024711E+02 | 2.597228E+02 | 4.474204E+03 | -9.310126E+03 |
| 31 | -1.201128E+01 | -3.552325E+00 | 8.013158E+01 | -1.027426E+02 |
| 32 | 4.804599E+00 | -5.670131E+00 | 2.398984E+00 | 2.117537E+00 |
| 41 | -2.798940E-01 | 1.579907E-01 | 5.649683E-02 | -6.973418E-02 |
| 42 | -2.978341E-01 | 8.507115E-02 | -4.117880E-04 | -3.488590E-03 |

FIG.27

| | | Second Example | | | | | |
|---|---|---|---|---|---|---|---|
| | EFL(Effective Focal Length)= 1.67 mm., HFOV(Half Field Of View)= 46 deg., Total length=3.97mm., Fno= 2.0 |||||||
| No. | | Curvature Radius | Ape. Stop Distance Lens Thickness Air Gap | Refractive Index | Abbe Surface No. | Focal Length | Material |
| | Object | Infinity | 0.1 | | | | |
| 11 | First Lens | 5.087590069 | 0.590467177 | 1.650405349 | 21.66664999 | -5.62978 | Plastic |
| 12 | | 2.031822001 | 0.172006688 | | | | |
| 21 | Second Lens | 0.671055709 | 0.210754577 | 1.531884673 | 55.98225682 | 13.40454 | Plastic |
| 22 | | 0.66 | 0.182300256 | | | | |
| 80 | Ape. Stop | Infinity | 0.022222217 | | | | |
| 31 | Third Lens | 2.7 | 0.749579606 | 1.53504875 | 55.71236184 | 2.38554 | Plastic |
| 32 | | -2.186502978 | 0.205164485 | | | | |
| 41 | Fourth Lens | 1.29724669 | 0.877993786 | 1.531129578 | 55.74414132 | 2.71805 | Plastic |
| 42 | | 9.789463223 | 0.151171669 | | | | |
| 72 | Filter | Infinity | 0.21 | 1.516800035 | 64.16733624 | | |
| | | Infinity | 0.599962251 | | | | |
| 71 | Image Plane | Infinity | | | | | |

FIG. 28

| Surface No. | K | a2 | a4 | a6 | a8 |
|---|---|---|---|---|---|
| 11 | 0.000000E+00 | 0.000000E+00 | 9.212767E-02 | -2.078442E-02 | 1.916534E-02 |
| 12 | 3.529135E+00 | 0.000000E+00 | -3.141124E-01 | 1.257782E+00 | -4.319398E+00 |
| 21 | -5.781074E+00 | 0.000000E+00 | 4.586536E-01 | -4.386025E+00 | 1.037844E+01 |
| 22 | -1.068439E+00 | 0.000000E+00 | -1.881098E-01 | -1.334580E+01 | 1.265928E+02 |
| 31 | -1.883856E+01 | 0.000000E+00 | -5.400543E-03 | -3.586590E-01 | 2.985040E+00 |
| 32 | 7.165209E-01 | 0.000000E+00 | -8.221439E-01 | 1.371685E+00 | -3.566628E+00 |
| 41 | -9.929200E+00 | 0.000000E+00 | -1.479292E-01 | -1.016607E-01 | 1.056656E-02 |
| 42 | -6.567795E+01 | 0.000000E+00 | 2.163328E-01 | -4.813720E-01 | 4.880081E-01 |

| Surface No. | a10 | a12 | a14 | a16 |
|---|---|---|---|---|
| 11 | 1.286225E-02 | -8.861769E-03 | -1.137710E-03 | 2.318607E-03 |
| 12 | 1.123991E+01 | -1.643648E+01 | 1.191275E+01 | -3.558210E+00 |
| 21 | -8.237210E+00 | -7.992282E+00 | 1.992550E+01 | -7.321056E+00 |
| 22 | -4.663737E+02 | 7.366468E+01 | 3.382952E+03 | -4.167588E+03 |
| 31 | -1.095306E+01 | 7.067643E-01 | 8.183401E+01 | -1.257918E+02 |
| 32 | 5.775712E+00 | -5.893484E+00 | 1.201900E+00 | 2.004484E+00 |
| 41 | -4.151497E-01 | 2.320523E-01 | 3.990390E-01 | -4.508621E-01 |
| 42 | -3.006877E-01 | 8.438859E-02 | -1.060266E-03 | -2.622898E-03 |

FIG.29

| | | | Third Example | | | | |
|---|---|---|---|---|---|---|---|
| | | | EFL(Effective Focal Length)= 1.68 mm., HFOV(Half Field Of View)= 46 deg., | | | | |
| | | | Total length=3.96mm., Fno= 2.0 | | | | |
| No. | | Curvature Radius | Ape. Stop Distance Lens Thickness Air Gap | Refractive Index | Abbe Surface No. | Focal Length | Material |
| | Object | Infinity | 0.1 | | | | |
| 11 | First Lens | 6.612216281 | 0.60867877 | 1.650405349 | 21.66664999 | -4.68060 | Plastic |
| 12 | | 2.008931434 | 0.092864184 | | | | |
| 21 | Second Lens | 0.650617335 | 0.235117119 | 1.531884673 | 55.98225682 | 8.87007 | Plastic |
| 22 | | 0.66 | 0.180631327 | | | | |
| 80 | Ape. Stop | Infinity | 0.021254097 | | | | |
| 31 | Third Lens | 2.7 | 0.76400807 | 1.53504875 | 55.71236184 | 2.54977 | Plastic |
| 32 | | -2.48563025 | 0.193848096 | | | | |
| 41 | Fourth Lens | 1.218571593 | 0.918809848 | 1.531129578 | 55.74414132 | 2.46008 | Plastic |
| 42 | | 13.35375548 | 0.135262641 | | | | |
| 72 | Filter | Infinity | 0.21 | 1.516800035 | 64.16733624 | | |
| | | Infinity | 0.599971546 | | | | |
| 71 | Image Plane | Infinity | | | | | |

FIG. 30

| Surface No. | K | a2 | a4 | a6 | a8 |
|---|---|---|---|---|---|
| 11 | 0.000000E+00 | 0.000000E+00 | 1.373762E-01 | -3.376582E-02 | 1.684243E-02 |
| 12 | 4.375472E+00 | 0.000000E+00 | -3.278110E-01 | 1.329192E+00 | -4.302063E+00 |
| 21 | -5.153971E+00 | 0.000000E+00 | 4.677908E-01 | -4.500619E+00 | 1.042729E+01 |
| 22 | -1.162670E+00 | 0.000000E+00 | -2.222180E-01 | -1.249232E+01 | 1.251657E+02 |
| 31 | -2.443746E+01 | 0.000000E+00 | -1.125275E-02 | -2.439637E-01 | 3.164005E+00 |
| 32 | 4.114377E+00 | 0.000000E+00 | -8.785928E-01 | 1.381601E+00 | -3.358552E+00 |
| 41 | -9.693260E+00 | 0.000000E+00 | -1.796545E-01 | -1.044801E-01 | 2.608934E-02 |
| 42 | -3.030070E+01 | 0.000000E+00 | 2.045266E-01 | -4.873301E-01 | 4.887045E-01 |

| Surface No. | a10 | a12 | a14 | a16 |
|---|---|---|---|---|
| 11 | 1.360773E-02 | -7.880955E-03 | -5.134680E-04 | 2.600651E-03 |
| 12 | 1.115114E+01 | -1.662113E+01 | 1.175976E+01 | -3.530291E+00 |
| 21 | -7.765277E+00 | -7.490181E+00 | 1.971619E+01 | -1.046150E+01 |
| 22 | -4.870043E+02 | 1.334780E+02 | 3.709827E+03 | -5.328178E+03 |
| 31 | -1.140670E+01 | -1.792744E+00 | 7.831585E+01 | -1.049602E+02 |
| 32 | 5.870214E+00 | -5.945113E+00 | 1.128361E+00 | 1.776139E+00 |
| 41 | -3.963643E-01 | 2.473277E-01 | 4.143441E-01 | -4.114423E-01 |
| 42 | -2.996385E-01 | 8.484043E-02 | -9.777810E-04 | -2.688356E-03 |

FIG.31

| No. | | Curvature Radius | Ape. Stop Distance Lens Thickness Air Gap | Refractive Index | Abbe Surface No. | Focal Length | Material |
|---|---|---|---|---|---|---|---|
| | Fourth Example |||||||
| | EFL(Effective Focal Length)= 1.55 mm., HFOV(Half Field Of View)= 46 deg., Total length=4.48mm., Fno= 2.0 |||||||
| | Object | Infinity | 0 | | | | |
| 11 | First Lens | 17.52063799 | 0.562196151 | 1.650405349 | 21.66664999 | -3.20284 | Plastic |
| 12 | | 1.838242116 | 0.109830996 | | | | |
| 21 | Second Lens | 0.795934196 | 0.259175253 | 1.531884673 | 55.98225682 | -10.02164 | Plastic |
| 22 | | 0.614228862 | 0.315548546 | | | | |
| 80 | Ape. Stop | Infinity | 0.034802347 | | | | |
| 31 | Third Lens | 3.507148273 | 0.904960676 | 1.53504875 | 55.71236184 | 2.03826 | Plastic |
| 32 | | -1.440377667 | 0.219693206 | | | | |
| 41 | Fourth Lens | 0.87118116 | 0.270945541 | 1.531129578 | 55.74414132 | 2.82395 | Plastic |
| 42 | | 1.854132802 | 0.3 | | | | |
| 72 | Filter | Infinity | 0.21 | 1.516800035 | 64.16733624 | | |
| | | Infinity | 1.291765215 | | | | |
| 71 | Image Plane | Infinity | | | | | |

FIG. 32

| Surface No. | K | a2 | a4 | a6 | a8 |
|---|---|---|---|---|---|
| 11 | 0.000000E+00 | 0.000000E+00 | 1.448273E-01 | -4.601104E-02 | 6.556222E-03 |
| 12 | 2.370370E+00 | 0.000000E+00 | -2.154455E-01 | 1.048585E+00 | -4.364460E+00 |
| 21 | -3.163873E+00 | 0.000000E+00 | 4.242909E-01 | -4.020396E+00 | 1.060928E+01 |
| 22 | 0.000000E+00 | 0.000000E+00 | 4.725486E-01 | -1.146030E+01 | 1.087652E+02 |
| 31 | -1.574943E+01 | 0.000000E+00 | -4.284567E-02 | 2.715857E-01 | 3.577080E+00 |
| 32 | 0.000000E+00 | 0.000000E+00 | -1.051306E+00 | 2.104594E+00 | -3.663966E+00 |
| 41 | -6.781856E+00 | 0.000000E+00 | -1.737725E-02 | -2.284242E-01 | 1.420765E-01 |
| 42 | 0.000000E+00 | 0.000000E+00 | 5.804980E-02 | -4.906810E-01 | 4.741618E-01 |

| Surface No. | a10 | a12 | a14 | a16 |
|---|---|---|---|---|
| 11 | 1.528681E-02 | -5.996717E-03 | -7.894180E-04 | 5.167700E-04 |
| 12 | 1.150591E+01 | -1.684141E+01 | 1.219474E+01 | -3.357437E+00 |
| 21 | -9.498541E+00 | -9.067077E+00 | 2.745466E+01 | -1.661955E+01 |
| 22 | -4.877081E+02 | 3.623828E+02 | 4.297828E+03 | -7.428650E+03 |
| 31 | -1.274837E+01 | -2.358185E+00 | 8.916852E+01 | -1.270558E+02 |
| 32 | 4.902746E+00 | -5.534333E+00 | 2.290356E+00 | 3.598810E+00 |
| 41 | -2.847367E-01 | 1.604831E-01 | 5.424753E-02 | -1.559969E-01 |
| 42 | -3.062273E-01 | 8.679225E-02 | -1.195666E-03 | -5.686108E-03 |

FIG.33

| No. | | Curvature Radius | Ape. Stop Distance Lens Thickness Air Gap | Refractive Index | Abbe Surface No. | Focal Length | Material |
|---|---|---|---|---|---|---|---|
| | Fifth Example |
| | EFL(Effective Focal Length)= 1.44 mm., HFOV(Half Field Of View)= 46 deg., Total length=3.79mm., Fno= 2.0 |
| | Object | Infinity | 0 | | | | |
| 11 | First Lens | 12.47217639 | 1.258411425 | 1.650405349 | 21.66664999 | -5.20643 | Plastic |
| 12 | | 2.557312668 | 0.07 | | | | |
| 21 | Second Lens | 0.937699757 | 0.294648764 | 1.531884673 | 55.98225682 | 8.25399 | Plastic |
| 22 | | 1.062290413 | 0.091520239 | | | | |
| 80 | Ape. Stop | Infinity | 0.004322672 | | | | |
| 31 | Third Lens | 3.052411887 | 0.495718121 | 1.53504875 | 55.71236184 | 1.92191 | Plastic |
| 32 | | -1.462951129 | 0.345114903 | | | | |
| 41 | Fourth Lens | 0.773853941 | 0.379908958 | 1.531129578 | 55.74414132 | 2.89888 | Plastic |
| 42 | | 1.290866632 | 0.3 | | | | |
| 72 | Filter | Infinity | 0.21 | 1.516800035 | 64.16733624 | | |
| | | Infinity | 0.345721388 | | | | |
| 71 | Image Plane | Infinity | | | | | |

FIG. 34

| Surface No. | K | a2 | a4 | a6 | a8 |
|---|---|---|---|---|---|
| 11 | 0.000000E+00 | 0.000000E+00 | 6.771976E-02 | -4.347814E-02 | 5.855657E-03 |
| 12 | 2.040365E+00 | 0.000000E+00 | -2.494392E-01 | 1.020986E+00 | -4.524275E+00 |
| 21 | -7.376221E+00 | 0.000000E+00 | 2.471400E-01 | -4.367381E+00 | 1.050863E+01 |
| 22 | 0.000000E+00 | 0.000000E+00 | 4.575819E-02 | -1.310717E+01 | 1.218118E+02 |
| 31 | -6.203330E+01 | 0.000000E+00 | -1.376077E-01 | 1.845135E-01 | 3.920528E+00 |
| 32 | 0.000000E+00 | 0.000000E+00 | -1.009556E+00 | 2.343053E+00 | -4.287041E+00 |
| 41 | -4.303369E+00 | 0.000000E+00 | 5.808813E-02 | -3.078989E-01 | 9.462516E-02 |
| 42 | 0.000000E+00 | 0.000000E+00 | -6.604604E-03 | -5.730614E-01 | 5.009957E-01 |

| Surface No. | a10 | a12 | a14 | a16 |
|---|---|---|---|---|
| 11 | 1.490363E-02 | -6.077900E-03 | -8.286610E-04 | 4.652640E-04 |
| 12 | 1.116789E+01 | -1.713359E+01 | 1.254422E+01 | -1.056368E+00 |
| 21 | -7.988105E+00 | -3.651144E+00 | 3.637471E+01 | -2.528229E+01 |
| 22 | -4.465717E+02 | 3.565565E+02 | 4.150154E+03 | 1.629017E+03 |
| 31 | -9.016882E+00 | 2.177556E+01 | 1.078973E+02 | -7.825961E+02 |
| 32 | 2.912408E+00 | -7.527478E+00 | 7.286900E+00 | 3.795233E+01 |
| 41 | -2.699875E-01 | 2.064781E-01 | 9.836612E-02 | -1.356652E-01 |
| 42 | -2.922414E-01 | 8.557521E-02 | -5.143248E-03 | -6.934312E-03 |

FIG.35

| No. | | Curvature Radius | Ape. Stop Distance Lens Thickness Air Gap | Refractive Index | Abbe Surface No. | Focal Length | Material |
|---|---|---|---|---|---|---|---|
| | Object | Infinity | 0 | | | | |
| 11 | First Lens | 11.2898866 | 0.764047084 | 1.650405349 | 21.66664999 | -3.09153 | Plastic |
| 12 | | 1.66124761 | 0.125905848 | | | | |
| 21 | Second Lens | 1.025184541 | 0.226531062 | 1.531884673 | 55.98225682 | -6.21284 | Plastic |
| 22 | | 0.722411518 | 0.384634081 | | | | |
| 80 | Ape. Stop | Infinity | -0.018976037 | | | | |
| 31 | Third Lens | 4.404689808 | 1.070144368 | 1.53504875 | 55.71236184 | 2.60434 | Plastic |
| 32 | | -1.865660672 | 0.131479085 | | | | |
| 41 | Fourth Lens | 1.258730999 | 1.567235139 | 1.531129578 | 55.74414132 | 2.54879 | Plastic |
| 42 | | 10.18916382 | 0.3 | | | | |
| 72 | Filter | Infinity | 0.21 | 1.516800035 | 64.16733624 | | |
| | | Infinity | 0.876283921 | | | | |
| 71 | Image Plane | Infinity | | | | | |

Sixth Example
EFL(Effective Focal Length)= 1.66 mm., HFOV(Half Field Of View)= 46 deg.,
Total length=5.63mm., Fno= 2.0

FIG. 36

| Surface No. | K | a2 | a4 | a6 | a8 |
|---|---|---|---|---|---|
| 11 | 0.000000E+00 | 0.000000E+00 | 9.735709E-02 | -4.037054E-02 | -1.502671E-03 |
| 12 | 2.186964E+00 | 0.000000E+00 | -3.592374E-01 | 9.213916E-01 | -4.366351E+00 |
| 21 | -1.395314E+01 | 0.000000E+00 | 5.113014E-01 | -3.890660E+00 | 1.053127E+01 |
| 22 | 0.000000E+00 | 0.000000E+00 | 3.686453E-01 | -9.949512E+00 | 1.164246E+02 |
| 31 | 7.455814E+00 | 0.000000E+00 | 5.072329E-02 | 9.886684E-02 | 3.550144E+00 |
| 32 | 0.000000E+00 | 0.000000E+00 | -8.624340E-01 | 1.892504E+00 | -3.774297E+00 |
| 41 | -1.167842E+01 | 0.000000E+00 | -3.182216E-02 | -3.822566E-02 | 1.797422E-01 |
| 42 | 0.000000E+00 | 0.000000E+00 | 2.835730E-01 | -4.299877E-01 | 4.621095E-01 |

| Surface No. | a10 | a12 | a14 | a16 |
|---|---|---|---|---|
| 11 | 1.476891E-02 | -5.108792E-03 | -5.552830E-04 | 3.970800E-04 |
| 12 | 1.161872E+01 | -1.671968E+01 | 1.217136E+01 | -3.628989E+00 |
| 21 | -9.839022E+00 | -9.633540E+00 | 2.710683E+01 | -1.584727E+01 |
| 22 | -4.927446E+02 | 2.612214E+02 | 3.947272E+03 | -7.889499E+03 |
| 31 | -1.178683E+01 | 8.340900E-02 | 8.860409E+01 | -1.635050E+02 |
| 32 | 5.295095E+00 | -4.851919E+00 | 2.236535E+00 | 6.145322E-01 |
| 41 | -3.075551E-01 | 1.436876E-01 | 7.883236E-02 | -5.686891E-02 |
| 42 | -3.056928E-01 | 9.078454E-02 | 1.353650E-03 | -4.341701E-03 |

FIG.37

| No. | | Curvature Radius | Ape. Stop Distance Lens Thickness Air Gap | Refractive Index | Abbe Surface No. | Focal Length | Material |
|---|---|---|---|---|---|---|---|
| | | Seventh Example | | | | | |
| | | EFL(Effective Focal Length)= 1.35 mm., HFOV(Half Field Of View)= 46 deg., | | | | | |
| | | Total length=3.11mm., Fno= 2.0 | | | | | |
| | Object | Infinity | 0 | | | | |
| 11 | First Lens | 17.5064404 | 0.257464088 | 1.650405349 | 21.66664999 | -2.77552 | Plastic |
| 12 | | 1.626978681 | 0.067328496 | | | | |
| 21 | Second Lens | 0.826704357 | 1.026392566 | 1.531884673 | 55.98225682 | 1.82802 | Plastic |
| 22 | | 3.140983957 | 0.049283523 | | | | |
| 80 | Ape. Stop | Infinity | 0.006840736 | | | | |
| 31 | Third Lens | 5.542677607 | 0.456169297 | 1.53504875 | 55.71236184 | 2.95008 | Plastic |
| 32 | | -2.143614429 | 0.168598693 | | | | |
| 41 | Fourth Lens | 0.738113362 | 0.323906264 | 1.531129578 | 55.74414132 | 2.35142 | Plastic |
| 42 | | 1.529984391 | 0.3 | | | | |
| 72 | Filter | Infinity | 0.21 | 1.516800035 | 64.16733624 | | |
| | | Infinity | 0.239212164 | | | | |
| 71 | Image Plane | Infinity | | | | | |

FIG. 38

| Surface No. | K | a2 | a4 | a6 | a8 |
|---|---|---|---|---|---|
| 11 | 0.000000E+00 | 0.000000E+00 | 1.430708E-01 | -3.910643E-02 | 1.345938E-02 |
| 12 | 2.098893E+00 | 0.000000E+00 | -2.981691E-01 | 1.023598E+00 | -4.310891E+00 |
| 21 | -3.876493E+00 | 0.000000E+00 | 6.576322E-01 | -3.915577E+00 | 1.046291E+01 |
| 22 | 0.000000E+00 | 0.000000E+00 | 8.484959E-01 | -1.030117E+01 | 1.140911E+02 |
| 31 | -5.193993E+01 | 0.000000E+00 | -1.011338E-01 | 1.021853E+00 | 2.653780E+00 |
| 32 | 0.000000E+00 | 0.000000E+00 | -1.131225E+00 | 2.122902E+00 | -3.927316E+00 |
| 41 | -7.457080E+00 | 0.000000E+00 | 8.431137E-02 | -3.435460E-01 | -2.374795E-02 |
| 42 | 0.000000E+00 | 0.000000E+00 | -1.618466E-02 | -4.944206E-01 | 4.757698E-01 |

| Surface No. | a10 | a12 | a14 | a16 |
|---|---|---|---|---|
| 11 | 1.952128E-02 | -4.546594E-03 | -9.972450E-04 | -4.635690E-04 |
| 12 | 1.159007E+01 | -1.674635E+01 | 1.229623E+01 | -3.248087E+00 |
| 21 | -9.717412E+00 | -9.192698E+00 | 2.755532E+01 | -1.622127E+01 |
| 22 | -4.963123E+02 | 4.736381E+01 | 1.065675E+03 | -2.760829E+04 |
| 31 | -2.211863E+01 | -6.032805E+00 | 2.080710E+02 | -1.008777E+02 |
| 32 | 3.610493E+00 | -7.528971E+00 | 5.689222E+00 | 3.975292E+01 |
| 41 | -2.990676E-01 | 2.688519E-01 | 1.441323E-01 | -2.638232E-01 |
| 42 | -3.200602E-01 | 7.234893E-02 | -4.341301E-03 | 5.940433E-03 |

FIG.39

| | | | Eighth Example | | | | |
|---|---|---|---|---|---|---|---|
| \multicolumn{8}{c}{EFL(Effective Focal Length)= 1.63 mm., HFOV(Half Field Of View)= 46 deg.,} |
| \multicolumn{8}{c}{Total length=4.64mm., Fno= 2.0} |
| No. | | Curvature Radius | Ape. Stop Distance Lens Thickness Air Gap | Refractive Index | Abbe Surface No. | Focal Length | Material |
| | Object | Infinity | 0 | | | | |
| 11 | First Lens | 7.080359743 | 0.854546001 | 1.650405349 | 21.66664999 | -2.24787 | Plastic |
| 12 | | 1.154165632 | 0.338558509 | | | | |
| 21 | Second Lens | 0.638503789 | 0.430282758 | 1.531884673 | 55.98225682 | 3.62136 | Plastic |
| 22 | | 0.731638856 | 0.407535449 | | | | |
| 80 | Ape. Stop | Infinity | -0.014685746 | | | | |
| 31 | Third Lens | 2.764075009 | 0.468992169 | 1.53504875 | 55.71236184 | 1.75901 | Plastic |
| 32 | | -1.342663172 | 0.567563116 | | | | |
| 41 | Fourth Lens | 1.744542427 | 0.40242313 | 1.531129578 | 55.74414132 | 4.11950 | Plastic |
| 42 | | 7.918935797 | 0.3 | | | | |
| 72 | Filter | Infinity | 0.21 | 1.516800035 | 64.16733624 | | |
| | | Infinity | 0.676588371 | | | | |
| 71 | Image Plane | Infinity | | | | | |

FIG. 40

| Surface No. | K | a2 | a4 | a6 | a8 |
|---|---|---|---|---|---|
| 11 | 0.000000E+00 | 0.000000E+00 | 7.214822E-02 | -6.841497E-03 | -1.192192E-02 |
| 12 | -8.031134E-02 | 0.000000E+00 | -8.473775E-02 | 7.377313E-01 | -3.941290E+00 |
| 21 | -4.167645E+00 | 0.000000E+00 | 1.454990E+00 | -5.043020E+00 | 9.779551E+00 |
| 22 | 0.000000E+00 | 0.000000E+00 | 1.002738E+00 | -1.867168E+01 | 1.310587E+02 |
| 31 | -2.389139E+01 | 0.000000E+00 | 1.277805E-01 | -3.002066E-01 | 1.497913E+00 |
| 32 | 0.000000E+00 | 0.000000E+00 | -2.531612E-01 | 6.722543E-01 | -2.640618E+00 |
| 41 | -9.299414E+00 | 0.000000E+00 | -4.326947E-03 | -1.674621E-01 | 1.433285E-01 |
| 42 | 0.000000E+00 | 0.000000E+00 | 7.466185E-02 | -3.575939E-01 | 4.020614E-01 |

| Surface No. | a10 | a12 | a14 | a16 |
|---|---|---|---|---|
| 11 | 1.256511E-02 | -3.525777E-03 | -4.278600E-05 | 1.321640E-04 |
| 12 | 1.185730E+01 | -1.715314E+01 | 1.134361E+01 | -2.092991E+00 |
| 21 | -9.180194E+00 | -8.020781E+00 | 2.815083E+01 | -1.829628E+01 |
| 22 | -4.145127E+02 | 6.496320E+01 | 2.454376E+03 | -3.470729E+03 |
| 31 | -9.556895E+00 | 3.216250E+01 | 1.599931E+02 | -6.355674E+02 |
| 32 | 7.590736E+00 | -6.853588E+00 | -6.314441E+00 | 2.209002E+01 |
| 41 | -3.073711E-01 | 1.694834E-01 | 1.115393E-01 | -6.773826E-02 |
| 42 | -3.349425E-01 | 1.019484E-01 | 1.795930E-02 | -6.430810E-04 |

FIG41

| Ninth Example |||||||
|---|---|---|---|---|---|---|
| EFL(Effective Focal Length)= 1.45 mm., HFOV(Half Field Of View)= 46 deg., Total length=3.67mm., Fno= 2.0 |||||||
| No. | | Curvature Radius | Ape. Stop Distance Lens Thickness Air Gap | Refractive Index | Abbe Surface No. | Focal Length | Material |
| | Object | Infinity | 0 | | | | |
| 11 | First Lens | 8.133042365 | 0.27989408 | 1.650405349 | 21.66664999 | -5.20532 | Plastic |
| 12 | | 2.358056828 | 0.067059849 | | | | |
| 21 | Second Lens | 0.805118965 | 0.319647606 | 1.531884673 | 55.98225682 | -13.40722 | Plastic |
| 22 | | 0.623715269 | 0.238743804 | | | | |
| 80 | Ape. Stop | Infinity | -0.040740715 | | | | |
| 31 | Third Lens | 1.192728684 | 1.404704454 | 1.53504875 | 55.71236184 | 1.52904 | Plastic |
| 32 | | -1.535508344 | 0.07743203 | | | | |
| 41 | Fourth Lens | 0.892872079 | 0.425753463 | 1.531129578 | 55.74414132 | 3.73243 | Plastic |
| 42 | | 1.355861152 | 0.3 | | | | |
| 72 | Filter | Infinity | 0.21 | 1.516800035 | 64.16733624 | | |
| | | Infinity | 0.390448084 | | | | |
| 71 | Image Plane | Infinity | | | | | |

FIG. 42

| Surface No. | K | a2 | a4 | a6 | a8 |
|---|---|---|---|---|---|
| 11 | 0.000000E+00 | 0.000000E+00 | 1.188534E-01 | -4.971095E-02 | 2.137971E-03 |
| 12 | 2.519015E+00 | 0.000000E+00 | -2.767212E-01 | 1.059768E+00 | -4.322820E+00 |
| 21 | -4.780119E+00 | 0.000000E+00 | 5.331497E-01 | -3.785730E+00 | 1.090928E+01 |
| 22 | 0.000000E+00 | 0.000000E+00 | 1.806652E-01 | -1.356031E+01 | 1.117794E+02 |
| 31 | -4.280158E-01 | 0.000000E+00 | 7.054833E-02 | -2.650110E-01 | 2.947387E-01 |
| 32 | 0.000000E+00 | 0.000000E+00 | -9.558106E-01 | 2.241930E+00 | -3.628980E+00 |
| 41 | -6.034723E+00 | 0.000000E+00 | -1.358081E-01 | -7.222613E-02 | 7.826487E-02 |
| 42 | 0.000000E+00 | 0.000000E+00 | 3.963343E-02 | -5.428189E-01 | 4.859441E-01 |

| Surface No. | a10 | a12 | a14 | a16 |
|---|---|---|---|---|
| 11 | 1.154869E-02 | -8.568450E-03 | -2.321994E-03 | -1.917980E-04 |
| 12 | 1.153287E+01 | -1.684612E+01 | 1.215533E+01 | -3.434085E+00 |
| 21 | -9.236952E+00 | -9.269211E+00 | 2.579124E+01 | -2.150539E+01 |
| 22 | -4.493618E+02 | 5.356673E+02 | 4.357269E+03 | -1.580949E+04 |
| 31 | -1.583729E+01 | 9.711171E+01 | 8.613262E+02 | -5.301426E+03 |
| 32 | 4.724465E+00 | -5.929743E+00 | 1.996723E+00 | 4.553972E+00 |
| 41 | -4.976080E-01 | 1.618724E-02 | 9.019407E-02 | 6.193764E-02 |
| 42 | -2.932290E-01 | 9.247771E-02 | -9.757240E-04 | -6.804373E-03 |

FIG43

|  | Range lower limit | Range upper limit | Example 1 | Example 2 | Example 3 | Example 4 | Example 5 | Example 6 | Example 7 | Example 8 | Example 9 |
|---|---|---|---|---|---|---|---|---|---|---|---|
| TTL |  |  | 4.000 | 3.972 | 3.960 | 4.479 | 3.795 | 5.637 | 3.105 | 4.642 | 3.673 |
| ALT |  |  | 2.064 | 2.429 | 2.527 | 1.997 | 2.429 | 3.628 | 2.064 | 2.156 | 2.430 |
| AAG |  |  | 0.603 | 0.582 | 0.489 | 0.680 | 0.511 | 0.623 | 0.292 | 1.299 | 0.342 |
| BFL |  |  | 1.333 | 0.961 | 0.945 | 1.802 | 0.856 | 1.386 | 0.749 | 1.187 | 0.900 |
| EFL |  |  | 1.707 | 1.669 | 1.678 | 1.551 | 1.437 | 1.664 | 1.355 | 1.630 | 1.452 |
| $|υ1-υ2| \geq 20$ |  |  | 34.316 | 34.316 | 34.316 | 34.316 | 34.316 | 34.316 | 34.316 | 34.316 | 34.316 |
| $|υ2-υ3| \leq 10$ |  |  | 0.032 | 0.032 | 0.032 | 0.032 | 0.032 | 0.032 | 0.032 | 0.032 | 0.032 |
| ALT/G23 | 3.84 | 47.81 | 7.692 | 11.875 | 12.515 | 5.701 | 25.340 | 9.922 | 36.774 | 5.489 | 12.273 |
| ALT/G34 | 2.66 | 40.80 | 7.450 | 11.838 | 13.034 | 9.091 | 7.037 | 27.593 | 12.242 | 3.799 | 31.382 |
| ALT/AAG | 1.16 | 9.22 | 3.421 | 4.175 | 5.171 | 2.938 | 4.753 | 5.823 | 7.067 | 1.660 | 7.095 |
| ALT/T2 | 1.41 | 20.82 | 6.835 | 11.524 | 10.746 | 7.706 | 8.243 | 16.015 | 2.011 | 5.011 | 7.602 |
| EFL/BFL | 0.60 | 2.35 | 1.281 | 1.737 | 1.775 | 0.861 | 1.679 | 1.200 | 1.809 | 1.374 | 1.612 |
| T3/T4 | 0.48 | 4.34 | 2.946 | 0.854 | 0.832 | 3.340 | 1.305 | 0.683 | 1.408 | 1.165 | 3.299 |
| TTL/BFL | 1.74 | 5.77 | 3.001 | 4.132 | 4.190 | 2.486 | 4.435 | 4.066 | 4.145 | 3.912 | 4.079 |
| TTL/G12 | 9.60 | 89.82 | 69.093 | 23.090 | 42.648 | 40.780 | 54.220 | 44.774 | 46.120 | 13.710 | 54.771 |
| TTL/G23 | 8.27 | 71.93 | 14.909 | 19.419 | 19.617 | 12.784 | 39.600 | 15.417 | 55.327 | 11.816 | 18.550 |
| TTL/G34 | 5.72 | 61.66 | 14.439 | 19.358 | 20.431 | 20.387 | 10.997 | 42.876 | 18.418 | 8.178 | 47.434 |
| TTL/AAG | 2.50 | 13.94 | 6.631 | 6.828 | 8.106 | 6.588 | 7.428 | 9.048 | 10.632 | 3.573 | 10.724 |
| TTL/T1 | 2.11 | 17.06 | 7.007 | 6.726 | 6.507 | 7.967 | 3.016 | 7.378 | 12.061 | 5.432 | 13.123 |
| TTL/T2 | 2.12 | 32.35 | 13.247 | 18.845 | 16.845 | 17.281 | 12.881 | 24.885 | 3.025 | 10.788 | 11.491 |
| TTL/T3 | 1.83 | 12.87 | 4.499 | 5.298 | 5.184 | 4.949 | 7.656 | 5.268 | 6.807 | 9.897 | 2.615 |
| TTL/T4 | 2.52 | 21.49 | 13.253 | 4.524 | 4.310 | 16.531 | 9.990 | 3.597 | 9.587 | 11.535 | 8.627 |

FIG.44 the first lens element to the fourth lens element along the optical axis is AAG, AAG=G12+G23+G34.

OPTICAL IMAGING LENS AND ELECTRONIC DEVICE COMPRISING THE SAME

CROSS REFERENCE TO RELATED APPLICATION

This application claims priority from P.R.C. Patent Application No. 201410582232.2, filed on Oct. 24, 2014, the contents of which are hereby incorporated by reference in their entirety for all purposes.

BACKGROUND OF THE INVENTION

1. Field of the Invention

The present invention generally relates to an optical imaging lens set and an electronic device which includes such optical imaging lens set. Specifically speaking, the present invention is directed to a shorter optical imaging lens set of four lens elements and a shorter electronic device which includes such optical imaging lens set of four lens elements.

2. Description of the Prior Art

In recent years, the popularity of mobile phones and digital cameras makes the sizes of various portable electronic products reduce quickly, and so does that of the photography modules. The current trend of research is to develop an optical imaging lens set of a shorter length with uncompromised good quality. The most important characters of an optical imaging lens set are image quality and size.

The designing of the optical lens is not only just scaling down the optical lens which has good optical performance, but also needs to consider the material characteristics and satisfying some requirements like assembly yield.

Therefore, how to reduce the total length of a photographic device, but still maintain good optical performance, is an important research objective.

SUMMARY OF THE INVENTION

In light of the above, the present invention proposes an optical imaging lens set that is lightweight, has a low production cost, has an enlarged half of field of view, has a high resolution and has high image quality. The optical imaging lens set of four lens elements of the present invention has a first lens element, a second lens element, a third lens element and a fourth lens element sequentially from an object side to an image side along an optical axis.

An optical imaging lens includes: a first, second, third and fourth lens element, where the first lens element has negative refractive power, the second lens element has an image-side surface with a concave part in a vicinity of the optical axis, the third lens element has positive refractive power, and has an object-side surface with a convex part in a vicinity of the optical axis, the fourth lens element has an image-side surface with a concave part in a vicinity of the optical axis, wherein the optical imaging lens set does not include any lens element with refractive power other than said first, second, third and fourth lens elements.

In the optical imaging lens set of four lens elements of the present invention, an air gap G12 along the optical axis is disposed between the first lens element and the second lens element, an air gap G23 along the optical axis is disposed between the second lens element and the third lens element, an air gap G34 along the optical axis is disposed between the third lens element and the fourth lens element, and the sum of total three air gaps between adjacent lens elements from In the optical imaging lens set of four lens elements of the present invention, the first lens element has a first lens element thickness T1 along the optical axis, the second lens element has a second lens element thickness T2 along the optical axis, the third lens element has a third lens element thickness T3 along the optical axis, the fourth lens element has a fourth lens element thickness T4 along the optical axis, and the total thickness of all the lens elements in the optical imaging lens set along the optical axis is ALT, ALT=T1+T2+T3+T4.

Besides, the distance between an object-side surface of the first lens element to an image plane is TTL, the effective focal length of the optical imaging lens set is EFL, the distance between the image-side surface of the fourth lens element to an image plane along the optical axis is BFL (back focal length).

In addition, further defining: The focal length of the first lens element is f1; The focal length of the second lens element is f2; The focal length of the third lens element is f3; The focal length of the fourth lens element is f4; The refractive index of the first lens element is n1; The refractive index of the second lens element is n2; The refractive index of the third lens element is n3; The refractive index of the fourth lens element is n4; The Abbe number of the first lens element is ν1; The Abbe number of the second lens element is ν2; The Abbe number of the third lens element is ν3; The Abbe number of the fourth lens element is ν4.

In the optical imaging lens set of four lens elements of the present invention, the relationship EFL/BFL≤2.35 is satisfied.

In the optical imaging lens set of four lens elements of the present invention, the relationship TTL/AAG≤13.94 is satisfied.

In the optical imaging lens set of four lens elements of the present invention, the relationship TTL/G12≤89.82 is satisfied.

In the optical imaging lens set of four lens elements of the present invention, the relationship TTL/T2≤32.35 is satisfied.

In the optical imaging lens set of four lens elements of the present invention, the relationship ALT/G23≤47.81 is satisfied.

In the optical imaging lens set of four lens elements of the present invention, the relationship TTL/G23≤71.93 is satisfied.

In the optical imaging lens set of four lens elements of the present invention, the relationship ALT/G34≤40.80 is satisfied.

In the optical imaging lens set of four lens elements of the present invention, the relationship TTL/G34≤61.66 is satisfied.

In the optical imaging lens set of four lens elements of the present invention, the relationship TTL/T1≤17.06 is satisfied.

In the optical imaging lens set of four lens elements of the present invention, the relationship ALT/T2≤20.82 is satisfied.

In the optical imaging lens set of four lens elements of the present invention, the relationship TTL/T3≤12.87 is satisfied.

In the optical imaging lens set of four lens elements of the present invention, the relationship |ν1−ν2|≥20 is satisfied.

In the optical imaging lens set of four lens elements of the present invention, the relationship TTL/T4≤21.49 is satisfied.

In the optical imaging lens set of four lens elements of the present invention, the relationship TTL/BFL≤5.77 is satisfied.

In the optical imaging lens set of four lens elements of the present invention, the relationship |v2−v3|≤10 is satisfied.

In the optical imaging lens set of four lens elements of the present invention, the relationship ALT/AAG≤9.22 is satisfied.

In the optical imaging lens set of four lens elements of the present invention, the relationship T3/T4≤4.34 is satisfied.

The present invention also proposes an electronic device which includes the optical imaging lens set as described above. The electronic device includes a case and an image module disposed in the case. The image module includes an optical imaging lens set as described above, a barrel for the installation of the optical imaging lens set, a module housing unit for the installation of the barrel, a substrate for the installation of the module housing unit, and an image sensor disposed on the substrate and at an image side of the optical imaging lens set.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIGS. 1-5 illustrates the methods for determining the surface shapes and for determining one region is a region in a vicinity of the optical axis or the region in a vicinity of its circular periphery of one lens element.

FIG. 8 illustrates a second example of the optical imaging lens set of four lens elements of the present invention.

FIG. 9A illustrates the longitudinal spherical aberration on the image plane of the second example.

FIG. 9B illustrates the astigmatic aberration on the sagittal direction of the second example.

FIG. 9C illustrates the astigmatic aberration on the tangential direction of the second example.

FIG. 9D illustrates the distortion aberration of the second example.

FIG. 26 shows the optical data of the first example of the optical imaging lens set.

FIG. 27 shows the aspheric surface data of the first example.

FIG. 28 shows the optical data of the second example of the optical imaging lens set.

FIG. 29 shows the aspheric surface data of the second example.

FIG. 30 shows the optical data of the third example of the optical imaging lens set.

FIG. 31 shows the aspheric surface data of the third example.

FIG. 32 shows the optical data of the fourth example of the optical imaging lens set.

FIG. 33 shows the aspheric surface data of the fourth example.

FIG. 34 shows the optical data of the fifth example of the optical imaging lens set.

FIG. 35 shows the aspheric surface data of the fifth example.

FIG. 36 shows the optical data of the sixth example of the optical imaging lens set.

FIG. 37 shows the aspheric surface data of the sixth example.

FIG. 38 shows the optical data of the seventh example of the optical imaging lens set.

FIG. 39 shows the aspheric surface data of the seventh example.

FIG. 40 shows the optical data of the eighth example of the optical imaging lens set.

FIG. 41 shows the aspheric surface data of the eighth example.

FIG. 42 shows the optical data of the ninth example of the optical imaging lens set.

FIG. 43 shows the aspheric surface data of the ninth example.

FIG. 44 shows some important ratios in the examples.

DETAILED DESCRIPTION

Figure 6:
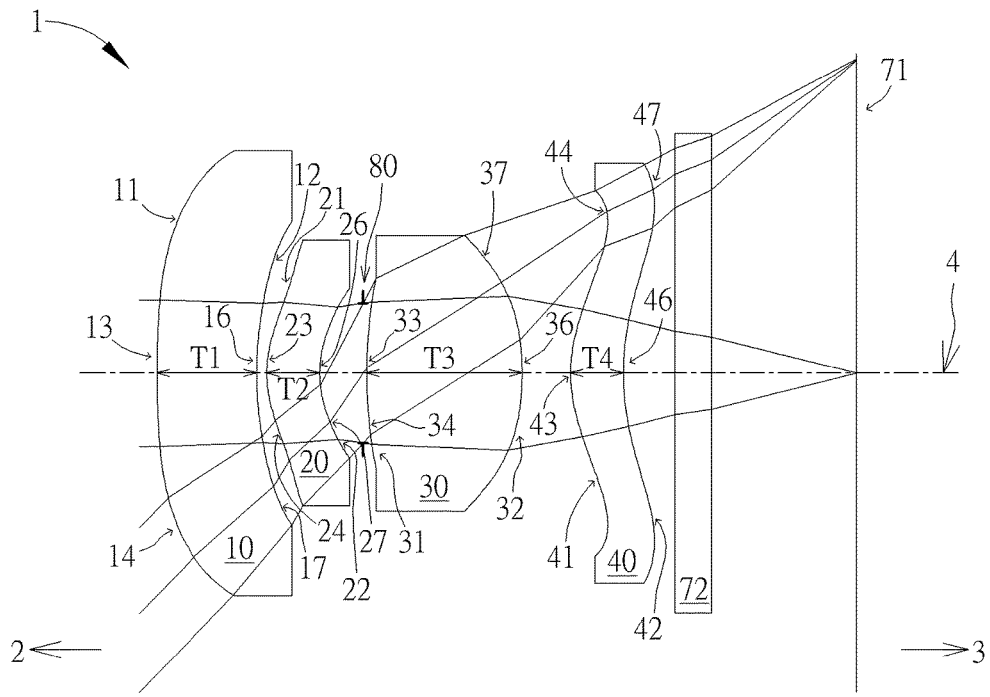
FIG. 6 illustrates a first example of the optical imaging lens set of the present invention.

Before the detailed description of the present invention, the first thing to be noticed is that in the present invention, similar (not necessarily identical) elements are labeled as the same numeral references. In the entire present specification, "a certain lens element has negative/positive refractive power" refers to the negative/positive refractive power of the lens element on the optical axis calculated by Gaussian optical theory. An object-side/image-side surface refers to the region which allows imaging light passing through, in the drawing, imaging light includes Lc (chief ray) and Lm (marginal ray). As shown in FIG. 1, the optical axis is "I" and the lens element is symmetrical with respect to the optical axis I. The region A that around the optical axis and for light to pass through is the region in a vicinity of the optical axis, and the region C that the marginal ray passing through is the region in a vicinity of a certain lens element's circular periphery. In addition, the lens element may include an extension part E for the lens element to be installed in an optical imaging lens set (that is the region outside the region C perpendicular to the optical axis). Ideally speaking, no light would pass through the extension part, and the actual structure and shape of the extension part is not limited to this and may have other variations. For the reason of simplicity, some of the extension part is not illustrated in the following examples. More, precisely, the method for determining the surface shapes or the region in a vicinity of the optical axis, the region in a vicinity of its circular periphery and other regions is described in following paragraph:

1. Please refer to FIG. 1, which is a cross section viewed lens element structure along the optical axis. As shown in cross section views, when determining the regions of the lens element, a middle point is defined as the intersection of the optical axis and the lens element's surface, and a conversion point is a point disposed on the surface of the lens element, the tangent of the conversion point is perpendicular to the optical axis. If there are more than one conversion points on the lens element, these conversion points are labeled as the first conversion point, the second conversion points . . . to the nth conversion point from the optical axis to outwardly. The region that is between the middle point and the first conversion point is the region in a vicinity of the optical axis, and the region outside the nth conversion point is the region in a vicinity of its circular periphery. And the other regions therebetween can be defined as different regions according to the conversion point. In addition, the optical effective radius refers to the perpendicular distance between the intersection of the marginal ray Lm and the surface of the lens element and the optical axis I.

2. As shown in FIG. 2, judging one region is a convex part or a concave part depends on the intersection of a parallel emitted light (or the extending line of the light) and the optical axis is disposed on the object side or disposed on the image side, the method mentioned above is also called light focusing method. For example, when the light passes through one region and focuses on the image-side, the intersection of the light and the optical axis is disposed on the image-side, such as the point R shown in FIG. 2, therefore, the region is a convex part. On the other hand, if the light passes through one region and the light is scattered, the intersection of the extending line of the light and the optical axis is disposed on the object-side, such as the point M shown in FIG. 2, therefore the region is a concave part. As shown in FIG. 2, the region between the optical axis and the first conversion point is a convex part, and the region outside the first conversion point is a concave part. It can be understood that the first conversion point is the demarcation point from the convex part to the concave part. Besides, the value R (refers to the radius of curvature, usually shown in lens data) can also determine the shapes of the region in vicinity of the optical axis. On the object-side, if the value R is positive, then the region is a convex part; if the value R is negative, then the region is a concave part. On the image-side, if the value R is positive, then the region is a concave part; if the value R is negative, then the region is a convex part. The method mentioned above can also determine the shapes of the region in vicinity of the optical axis and the result is the same with that judged by the light focusing method.

3. If there is not any conversion point on the surface of the lens element, the 0-50% optical effective radius is defined as the region in a vicinity of the optical axis, and the 50-100% optical effective radius is defined as the region in a vicinity of its circular periphery.

FIG. 3 is an example showing the lens element only having the first conversion point on the surface of the lens element, so the first region is a region in vicinity of the optical axis, and the second region is a region in vicinity of its circular periphery. The lens element has positive value R on the image-side, so the region in a vicinity of the optical axis is a concave part; since a conversion point is disposed between the first region and the second region, the shapes of the region in a vicinity of its circular periphery (the second region) are different from the shape of the region (the first region) that is near it. In other words, the shapes of the region in a vicinity of its circular periphery are different from the shape of the region in a vicinity of the optical axis, so the region in a vicinity of its circular periphery is a convex part.

FIG. 4 is an example showing the lens element having the first conversion point and the second conversion point on the surface of the lens element, so the first region is a region in vicinity of the optical axis, and the third region is a region in vicinity of its circular periphery. The lens element has positive value R on the object-side, so the region in a vicinity of the optical axis is a convex part; the region between the first conversion point and the second conversion point (the second region) is a concave part, so the region in a vicinity of its circular periphery (the third region) is a convex region.

FIG. 5 is an example showing the lens element having no conversion point on the surface of the lens element, so the 0-50% optical effective radius is defined as the region in a vicinity of the optical axis, and the 50-100% optical effective radius is defined as the region in a vicinity of its circular periphery. The lens element has positive value R on the object-side, so the region in a vicinity of the optical axis is a convex part, and since there is no conversion point disposed between the region in vicinity of the optical axis the region in vicinity of its circular periphery, the region in a vicinity of its periphery is a convex part.

As shown in FIG. 6, the optical imaging lens set 1 of four lens elements of the present invention, sequentially located from an object side 2 (where an object is located) to an image side 3 along an optical axis 4, have a first lens element 10, a second lens element 20, an aperture stop 80, a third lens element 30, a fourth lens element 40, a filter 72 and an image plane 71. Generally speaking, the first lens element 10, the second lens element 20, the third lens element 30 and the fourth lens element 40 may be made of a transparent plastic material and each has an appropriate refractive power, but the present invention is not limited to this. There are exclusively four lens elements with refractive power in the optical imaging lens set 1 of the present invention. The optical axis 4 is the optical axis of the entire optical imaging lens set 1, and the optical axis of each of the lens elements coincides with the optical axis of the optical imaging lens set 1.

Furthermore, the optical imaging lens set 1 includes an aperture stop (ape. stop) 80 disposed in an appropriate position. In FIG. 1, the aperture stop 80 is disposed between the second lens element 20 and the third lens element 30. When light emitted or reflected by an object (not shown) which is located at the object side 2 enters the optical imaging lens set 1 of the present invention, it forms a clear and sharp image on the image plane 71 at the image side 3 after passing through the first lens element 10, the second lens element 20, the aperture stop 80, the third lens element 30, the fourth lens element 40 and the filter 72.

In the embodiments of the present invention, the optional filter 72 may be a filter of various suitable functions, for example, the filter 72 may be an infrared cut filter (IR cut filter), placed between the fourth lens element 40 and the image plane 71. The filter 72 is made of glass.

Each lens element in the optical imaging lens set 1 of the present invention has an object-side surface facing toward the object side 2 as well as an image-side surface facing toward the image side 3. For example, the first lens element 10 has a first object-side surface 11 and a first image-side surface 12; the second lens element 20 has a second object-side surface 21 and a second image-side surface 22; the third lens element 30 has a third object-side surface 31 and a third image-side surface 32; the fourth lens element 40 has a fourth object-side surface 41 and a fourth image-side surface 42. In addition, each object-side surface and image-side surface in the optical imaging lens set 1 of the present invention has a part in a vicinity of its circular periphery (circular periphery part) away from the optical axis 4 as well as a part in a vicinity of the optical axis (optical axis part) close to the optical axis 4.

Each lens element in the optical imaging lens set 1 of the present invention further has a central thickness on the optical axis 4. For example, the first lens element 10 has a first lens element thickness T1, the second lens element 20 has a second lens element thickness T2, the third lens element 30 has a third lens element thickness T3, the fourth lens element 40 has a fourth lens element thickness T4. Therefore, the total thickness of all the lens elements in the optical imaging lens set 1 along the optical axis 4 is ALT, ALT=T1+T2+T3+T4.

In addition, between two adjacent lens elements in the optical imaging lens set 1 of the present invention there is an air gap along the optical axis 4. For example, an air gap G12 is disposed between the first lens element 10 and the second lens element 20, an air gap G23 is disposed between the second lens element 20 and the third lens element 30, and an air gap G34 is disposed between the third lens element 30 and the fourth lens element 40. Therefore, the sum of total three air gaps between adjacent lens elements from the first lens element 10 to the fourth lens element 40 along the optical axis 4 is AAG, AAG=G12+G23+G34.

In addition, the distance between the first object-side surface 11 of the first lens element 10 to the image plane 71, namely the total length of the optical imaging lens set along the optical axis 4 is TTL; the effective focal length of the optical imaging lens set is EFL; the distance between the fourth image-side surface 42 of the four lens element 40 to the image plane 71 along the optical axis 4 is BFL; the distance between the fourth image-side surface 42 of the four lens element 40 to the filter 72 along the optical axis 4 is G4F; the thickness of the filter 72 along the optical axis 4 is TF; the distance between the filter 72 to the image plane 71 along the optical axis 4 is GFP; Therefore, BFL=G4F+TF+GFP.

Furthermore, the focal length of the first lens element 10 is f1; the focal length of the second lens element 20 is f2; the focal length of the third lens element 30 is f3; the focal length of the fourth lens element 40 is f4; the refractive index of the first lens element 10 is n1; the refractive index of the second lens element 20 is n2; the refractive index of the third lens element 30 is n3; the refractive index of the fourth lens element 40 is n4; the Abbe number of the first lens element 10 is ν1; the Abbe number of the second lens element 20 is ν2; the Abbe number of the third lens element 30 is ν3; and the Abbe number of the fourth lens element 40 is ν4.

FIRST EXAMPLE

Figures 7A, 7B, 7C, 7D:
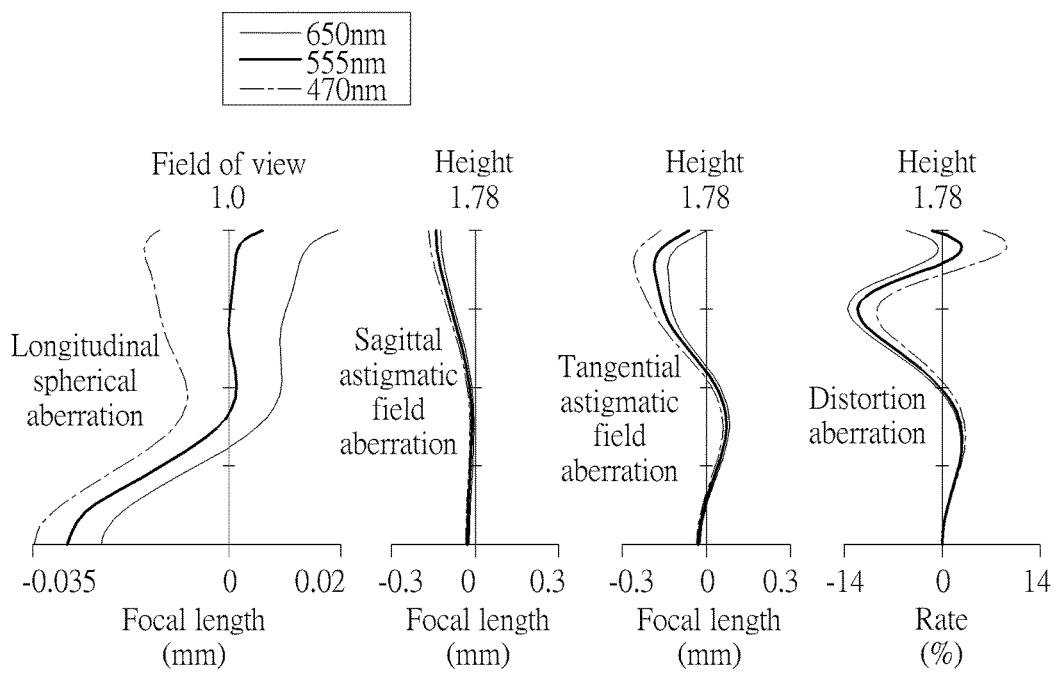
FIG. 7A illustrates the longitudinal spherical aberration on the image plane of the first example.
FIG. 7B illustrates the astigmatic aberration on the sagittal direction of the first example.
FIG. 7C illustrates the astigmatic aberration on the tangential direction of the first example.
FIG. 7D illustrates the distortion aberration of the first example.

Please refer to FIG. 6 which illustrates the first example of the optical imaging lens set 1 of the present invention. Please refer to FIG. 7A for the longitudinal spherical aberration on the image plane 71 of the first example; please refer to FIG. 7B for the astigmatic field aberration on the sagittal direction; please refer to FIG. 7C for the astigmatic field aberration on the tangential direction, and please refer to FIG. 7D for the distortion aberration. The Y axis of the spherical aberration in each example is "field of view" for 1.0. The Y axis of the astigmatic field and the distortion in each example stand for image height. The image height is 1.78 mm.

The optical imaging lens set 1 of the first example has four lens elements 10 to 40 made of a plastic material and having refractive power. The optical imaging lens set 1 also has an aperture stop 80, a filter 72, and an image plane 71. The aperture stop 80 is provided between the second lens element 20 and the third lens element 30. The filter 72 may be used for preventing specific wavelength light (such as the infrared light) from reaching the image plane to adversely affect the imaging quality.

The first lens element 10 has negative refractive power. The first object-side surface 11 facing toward the object side 2 is a convex surface, having a convex part 13 in the vicinity of the optical axis and a convex part 14 in a vicinity of its circular periphery. The first image-side surface 12 facing toward the image side 3 is a concave surface, having a concave part 16 in the vicinity of the optical axis and a concave part 17 in a vicinity of its circular periphery. Besides, both the first object-side surface 11 and the first image-side 12 of the first lens element 10 are aspherical surfaces.

The second lens element 20 has positive refractive power. The second object-side surface 21 facing toward the object side 2 has a convex part 23 in the vicinity of the optical axis and a convex part 24 in a vicinity of its circular periphery. The second image-side surface 22 facing toward the image side 3 is a concave surface, having a concave part 26 in the vicinity of the optical axis and a concave part 27 in a vicinity of its circular periphery. Both the second object-side surface 21 and the second image-side 22 of the second lens element 20 are aspherical surfaces.

The third lens element 30 has positive refractive power. The third object-side surface 31 facing toward the object side 2 has a convex part 33 in the vicinity of the optical axis and a convex part 34 in a vicinity of its circular periphery. The third image-side surface 32 facing toward the image side 3 is a convex surface, having a convex part 36 in the vicinity of the optical axis and a convex part 37 in a vicinity of its circular periphery. Both the third object-side surface 31 and the third image-side 32 of the third lens element 30 are aspherical surfaces.

The fourth lens element 40 has positive refractive power. The fourth object-side surface 41 facing toward the object side 2 has a convex part 43 in the vicinity of the optical axis and a concave part 44 in a vicinity of its circular periphery; The fourth image-side surface 42 facing toward the image side 3 has a concave part 46 in the vicinity of the optical axis and a convex part 47 in a vicinity of its circular periphery. Both the fourth object-side surface 41 and the fourth image-side 42 of the fourth lens element 40 are aspherical surfaces. The filter 72 may be disposed between the fourth lens element 40 and the image plane 71.

In the optical imaging lens element 1 of the present invention, the object-side surfaces 11/21/31/41 and image-side surfaces 12/22/32/42 are all aspherical. These aspheric coefficients are defined according to the following formula:

$$Z(Y) = \frac{Y^2}{R} \bigg/ \left(1 + \sqrt{1-(1+K)\frac{Y^2}{R^2}}\right) + \sum_{i=1}^{n} a_{2i} \times Y^{2i}$$

In which:
R represents the curvature radius of the lens element surface;
Z represents the depth of an aspherical surface (the perpendicular distance between the point of the aspherical surface at a distance Y from the optical axis and the tangent plane of the vertex on the optical axis of the aspherical surface);
Y represents a vertical distance from a point on the aspherical surface to the optical axis;
K is a conic constant; and
$a_{2i}$ is the aspheric coefficient of the 2i order.

The optical data of the first example of the optical imaging lens set 1 are shown in FIG. 26 while the aspheric surface data are shown in FIG. 27. In the present examples of the optical imaging lens set, the f-number of the entire optical lens element system is Fno, HFOV stands for the half field of view which is half of the field of view of the entire optical lens element system, and the unit for the curvature radius, the thickness and the focal length is in millimeters (mm). The length of the optical imaging lens set (the distance from the first object-side surface 11 of the first lens element 10 to the image plane 71) is 4.00 mm. HFOV is 46 degrees, and the image height is 1.78 mm. Some important ratios of the first example are shown in FIG. 44.

SECOND EXAMPLE

Please refer to FIG. 8 which illustrates the second example of the optical imaging lens set 1 of the present invention. It is noted that comparing the second example to the following examples, in order to simplify the figures, only the components different from what the first example has and the basic lens elements will be labeled in figures. Other components that are the same as what the first example has, such as the object-side surface, the image-side surface, the part in a vicinity of the optical axis and the part in a vicinity of its circular periphery will be omitted in the following example. Please refer to FIG. 9A for the longitudinal spherical aberration on the image plane 71 of the second example; please refer to FIG. 9B for the astigmatic aberration on the sagittal direction; please refer to FIG. 9C for the astigmatic aberration on the tangential direction, and please refer to FIG. 9D for the distortion aberration. The components in the second example are similar to those in the first example, but the optical data such as the curvature radius, the refractive power, the lens thickness, the lens focal length, the aspheric surface or the back focal length in this example are different from the optical data in the first example. The optical data of the second example of the optical imaging lens set are shown in FIG. 28 while the aspheric surface data are shown in FIG. 29. The length of the optical imaging lens set is 3.97 mm. HFOV is 46 degrees, and the image height is 1.78 mm. Some important ratios of the second example are shown in FIG. 44.

It is worth noting, compared with the first example, this example has some advantages such as having shorter total length, having better imaging quality, being easier to produce and having higher yield.

THIRD EXAMPLE

Figure 10:
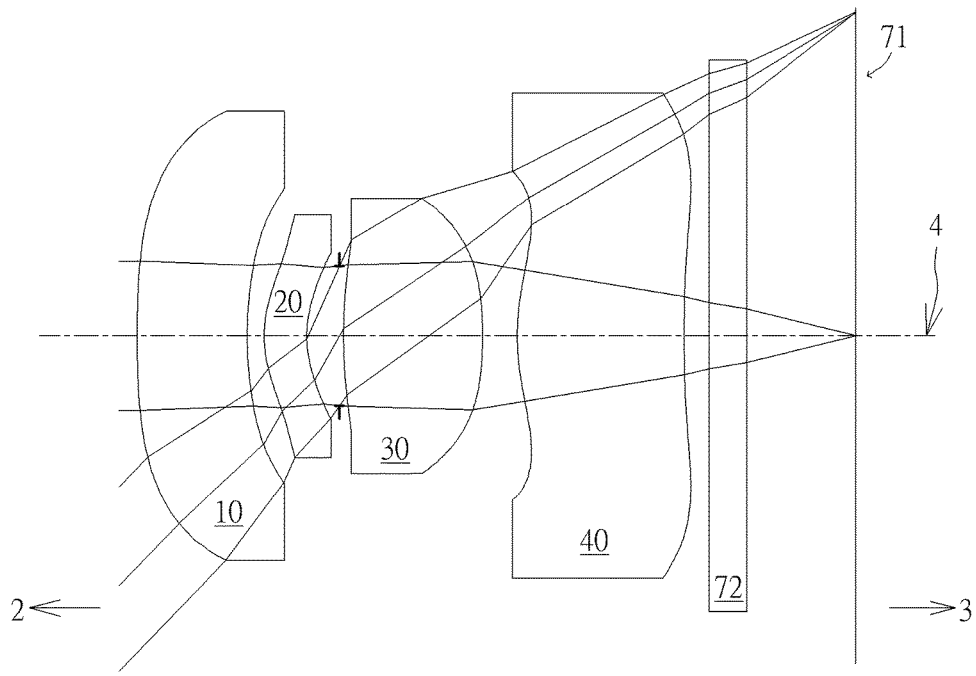
FIG. 10 illustrates a third example of the optical imaging lens set of four lens elements of the present invention.
Figures 11A, 11B, 11C, 11D:
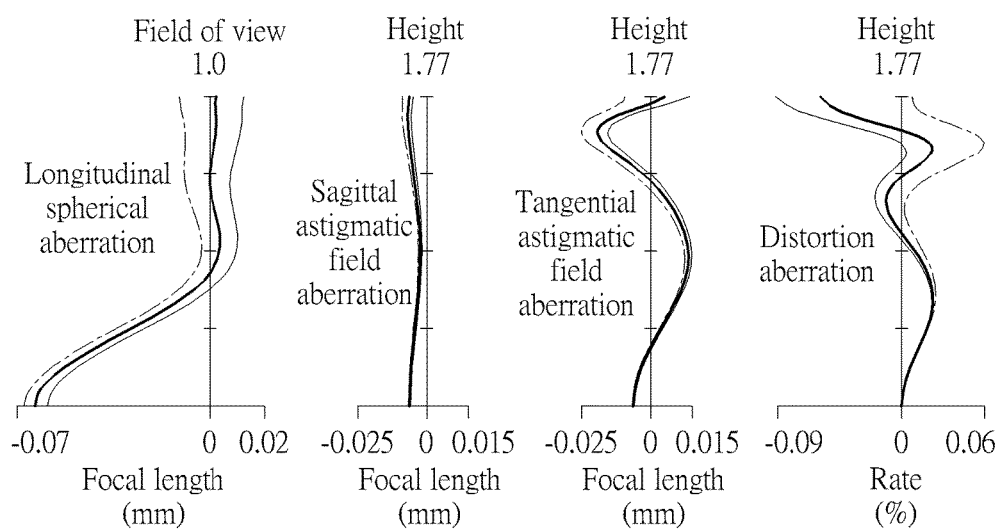
FIG. 11A illustrates the longitudinal spherical aberration on the image plane of the third example.
FIG. 11B illustrates the astigmatic aberration on the sagittal direction of the third example.
FIG. 11C illustrates the astigmatic aberration on the tangential direction of the third example.
FIG. 11D illustrates the distortion aberration of the third example.

Please refer to FIG. 10 which illustrates the third example of the optical imaging lens set 1 of the present invention. Please refer to FIG. 11A for the longitudinal spherical aberration on the image plane 71 of the third example; please refer to FIG. 11B for the astigmatic aberration on the sagittal direction; please refer to FIG. 11C for the astigmatic aberration on the tangential direction, and please refer to FIG. 11D for the distortion aberration. The components in the third example are similar to those in the first example, but the optical data such as the curvature radius, the refractive power, the lens thickness, the lens focal length, the aspheric surface or the back focal length in this example are different from the optical data in the first example. The optical data of the third example of the optical imaging lens set are shown in FIG. 30 while the aspheric surface data are shown in FIG. 31. The length of the optical imaging lens set is 3.96 mm. HFOV is 46 degrees, and the image height is 1.77 mm. Some important ratios of the third example are shown in FIG. 44.

It is worth noting, compared with the first example, this example has some advantages such as having shorter total length, being easier to produce and having higher yield.

FOURTH EXAMPLE

Figure 12:
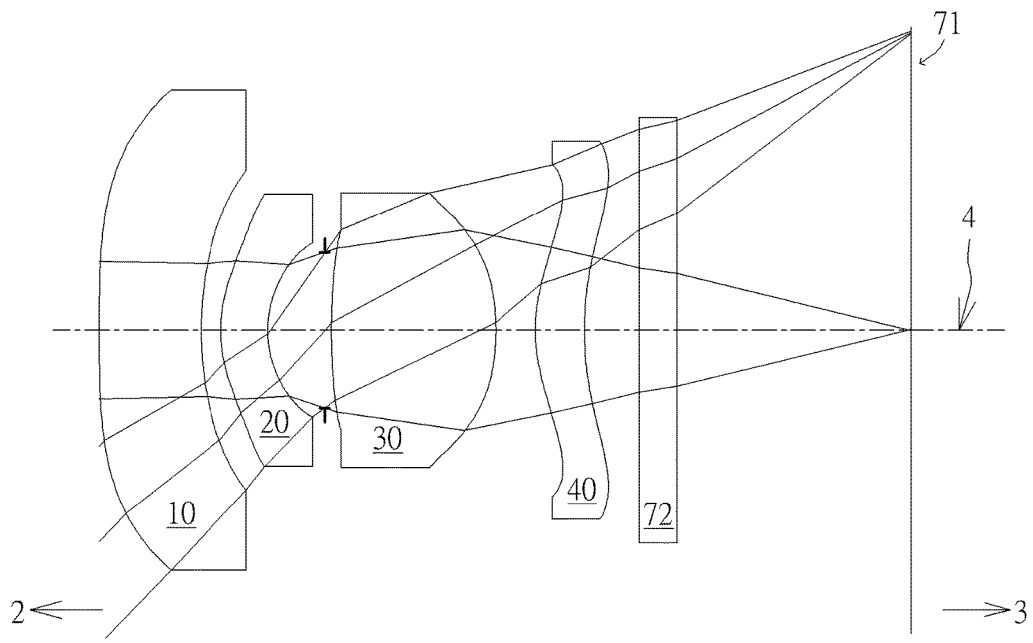
FIG. 12 illustrates a fourth example of the optical imaging lens set of four lens elements of the present invention.
Figures 13A, 13B, 13C, 13D:
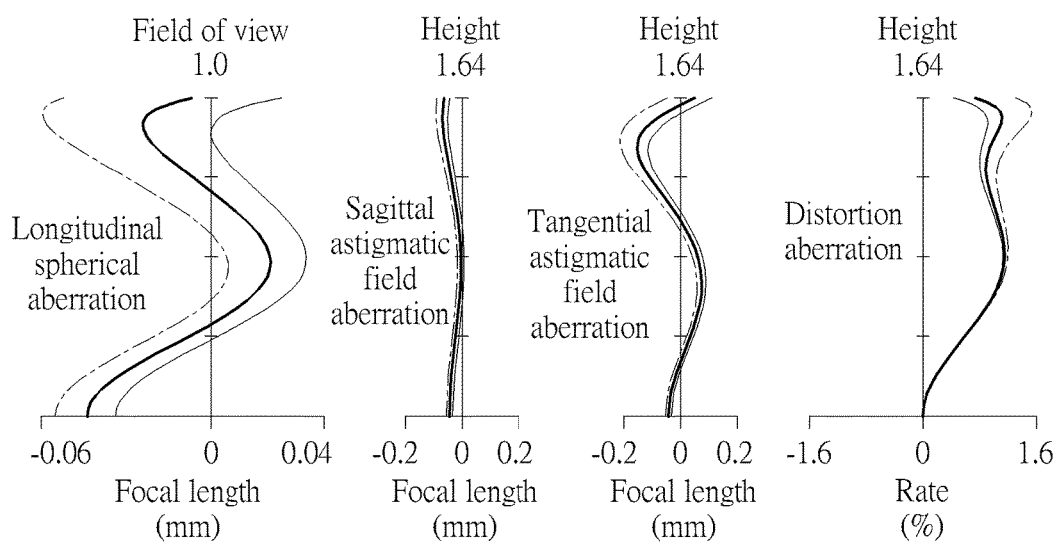
FIG. 13A illustrates the longitudinal spherical aberration on the image plane of the fourth example.
FIG. 13B illustrates the astigmatic aberration on the sagittal direction of the fourth example.
FIG. 13C illustrates the astigmatic aberration on the tangential direction of the fourth example.
FIG. 13D illustrates the distortion aberration of the fourth example.

Please refer to FIG. 12 which illustrates the fourth example of the optical imaging lens set 1 of the present invention. Please refer to FIG. 13A for the longitudinal spherical aberration on the image plane 71 of the fourth example; please refer to FIG. 13B for the astigmatic aberration on the sagittal direction; please refer to FIG. 13C for the astigmatic aberration on the tangential direction, and please refer to FIG. 13D for the distortion aberration. The components in the fourth example are similar to those in the first example, but the optical data such as the curvature radius, the refractive power, the lens thickness, the lens focal length, the aspheric surface or the back focal length in this example are different from the optical data in the first example, and in this example, the second lens element 20 has negative refractive power. The optical data of the fourth example of the optical imaging lens set are shown in FIG. 32 while the aspheric surface data are shown in FIG. 33. The length of the optical imaging lens set is 4.48 mm. HFOV is 46 degrees, and the image height is 1.77 mm. Some important ratios of the fourth example are shown in FIG. 44.

It is worth noting, compared with the first example, this example has some advantages such as being easier to produce and having higher yield.

FIFTH EXAMPLE

Figure 14:
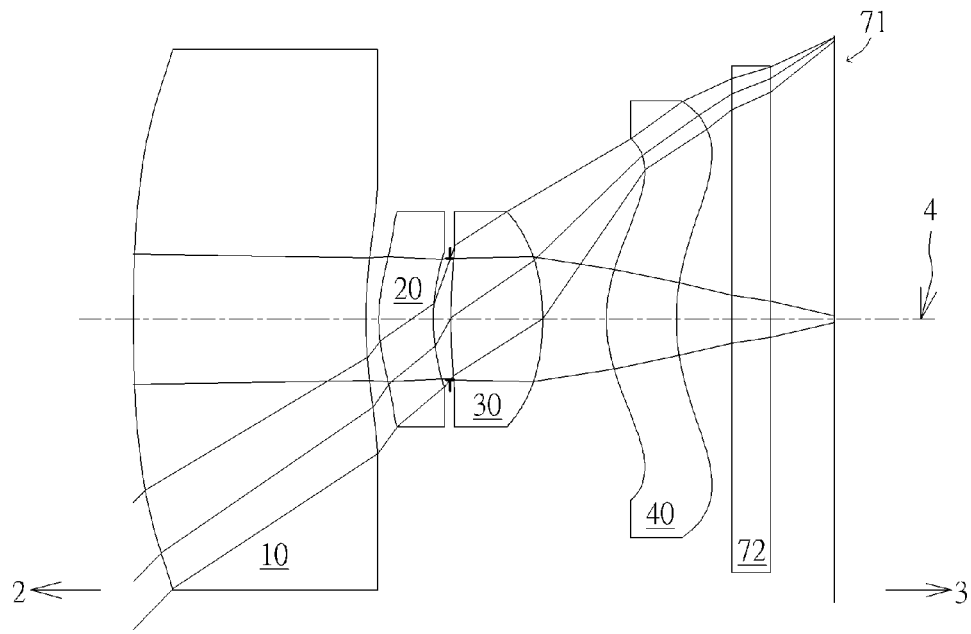
FIG. 14 illustrates a fifth example of the optical imaging lens set of four lens elements of the present invention.
Figures 15A, 15B, 15C, 15D:
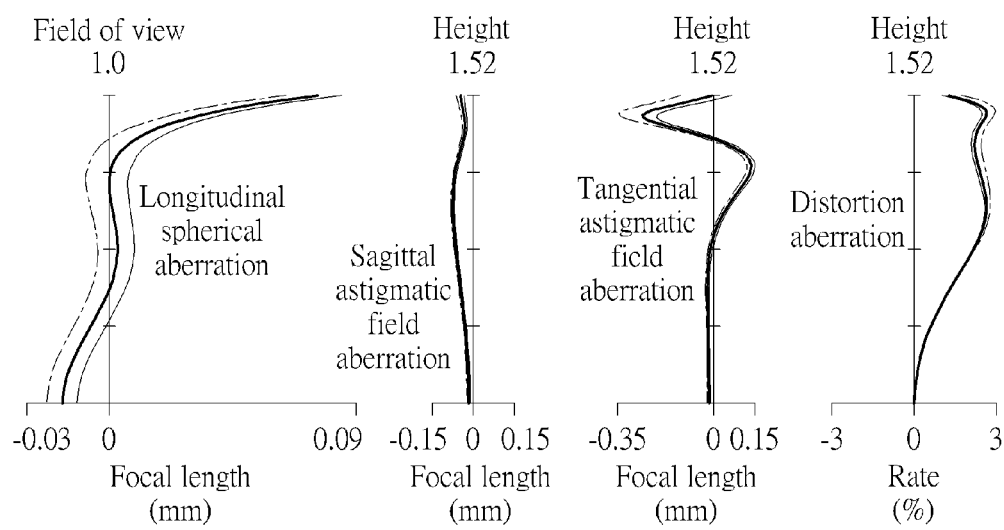
FIG. 15A illustrates the longitudinal spherical aberration on the image plane of the fifth example.
FIG. 15B illustrates the astigmatic aberration on the sagittal direction of the fifth example.
FIG. 15C illustrates the astigmatic aberration on the tangential direction of the fifth example.
FIG. 15D illustrates the distortion aberration of the fifth example.

Please refer to FIG. 14 which illustrates the fifth example of the optical imaging lens set 1 of the present invention. Please refer to FIG. 15A for the longitudinal spherical aberration on the image plane 71 of the fifth example; please refer to FIG. 15B for the astigmatic aberration on the sagittal direction; please refer to FIG. 15C for the astigmatic aberration on the tangential direction, and please refer to FIG. 15D for the distortion aberration. The components in the fifth example are similar to those in the first example, but the optical data such as the curvature radius, the refractive power, the lens thickness, the lens focal length, the aspheric surface or the back focal length in this example are different from the optical data in the first example. The optical data of the fifth example of the optical imaging lens set are shown in FIG. 34 while the aspheric surface data are shown in FIG. 35. The length of the optical imaging lens set is 3.79 mm. HFOV is 46 degrees, and the image height is 1.52 mm. Some important ratios of the fifth example are shown in FIG. 44.

It is worth noting, compared with the first example, this example has some advantages such as having shorter total length, having better imaging quality, being easier to produce and having higher yield.

SIXTH EXAMPLE

Figure 16:
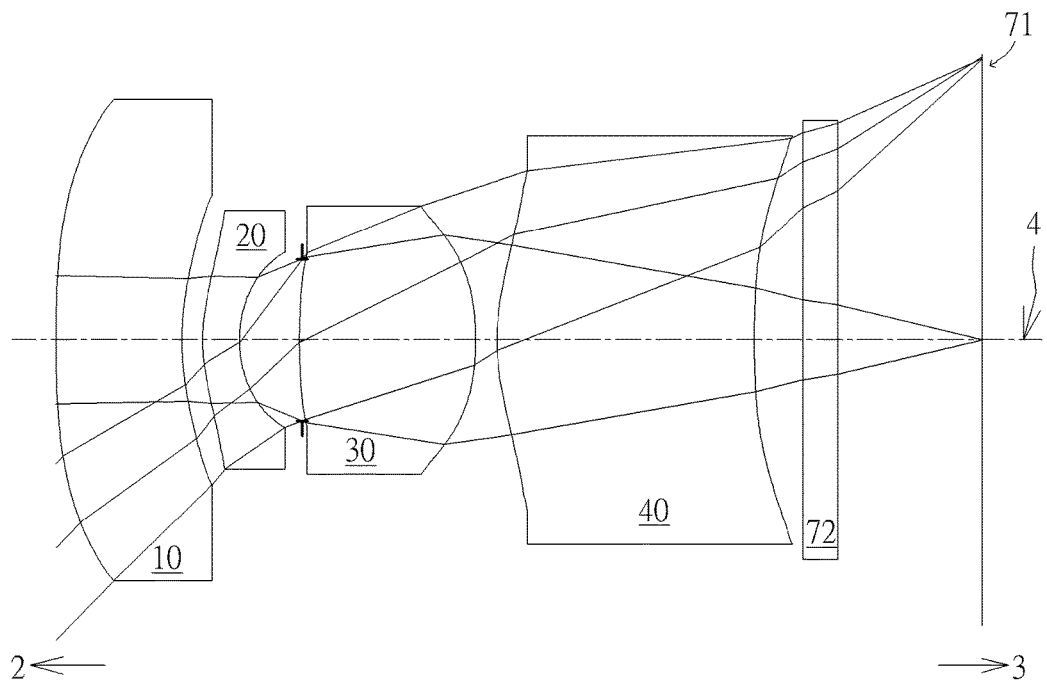
FIG. 16 illustrates a sixth example of the optical imaging lens set of four lens elements of the present invention.
Figures 17A, 17B, 17C, 17D:
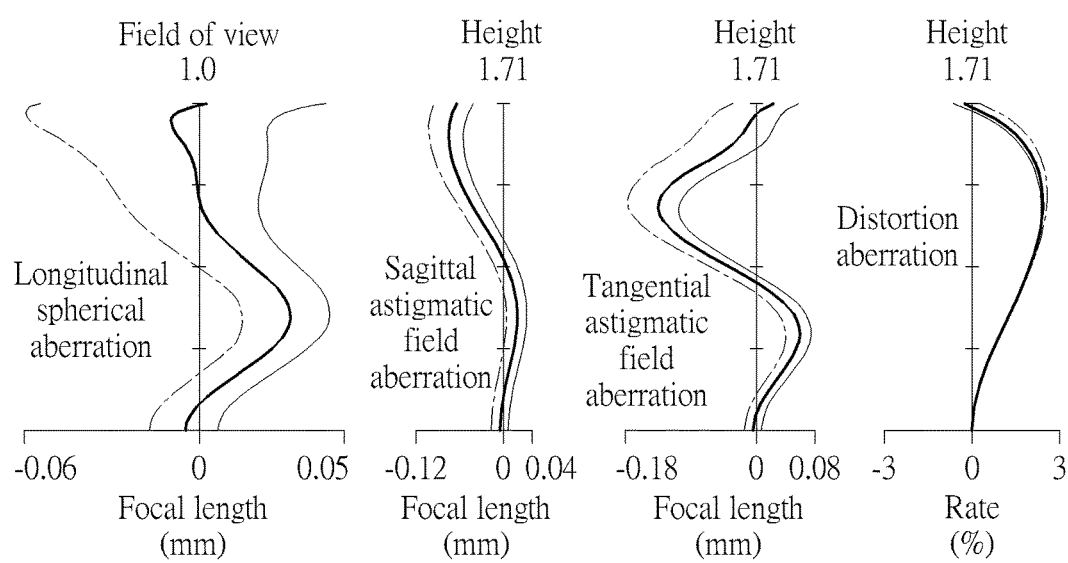
FIG. 17A illustrates the longitudinal spherical aberration on the image plane of the sixth example.
FIG. 17B illustrates the astigmatic aberration on the sagittal direction of the sixth example.
FIG. 17C illustrates the astigmatic aberration on the tangential direction of the sixth example.
FIG. 17D illustrates the distortion aberration of the sixth example.

Please refer to FIG. 16 which illustrates the sixth example of the optical imaging lens set 1 of the present invention. Please refer to FIG. 17A for the longitudinal spherical aberration on the image plane 71 of the sixth example; please refer to FIG. 17B for the astigmatic aberration on the sagittal direction; please refer to FIG. 17C for the astigmatic aberration on the tangential direction, and please refer to FIG. 17D for the distortion aberration. The components in the sixth example are similar to those in the first example, but the optical data such as the curvature radius, the refractive power, the lens thickness, the lens focal length, the aspheric surface or the back focal length in this example are different from the optical data in the first example, and in this example, the second lens element 20 has negative refractive power. The optical data of the sixth example of the optical imaging lens set are shown in FIG. 36 while the aspheric surface data are shown in FIG. 37. The length of the optical imaging lens set is 5.63 mm. HFOV is 46 degrees, and the image height is 1.71 mm. Some important ratios of the fifth example are shown in FIG. 44.

It is worth noting, compared with the first example, this example has some advantages such as having better imaging quality, being easier to produce and having higher yield.

SEVENTH EXAMPLE

Figure 18:
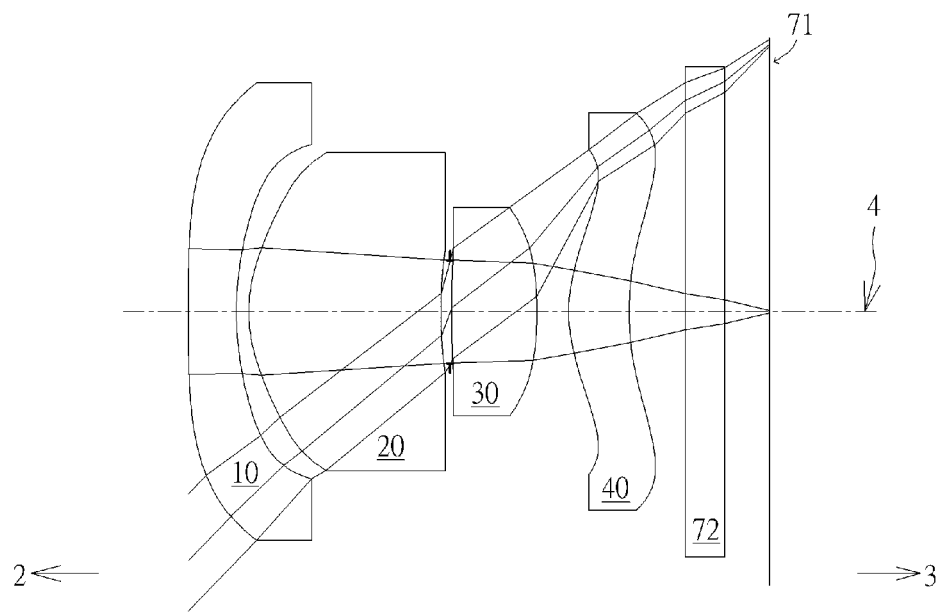
FIG. 18 illustrates a seventh example of the optical imaging lens set of four lens elements of the present invention.
Figures 19A, 19B, 19C, 19D:
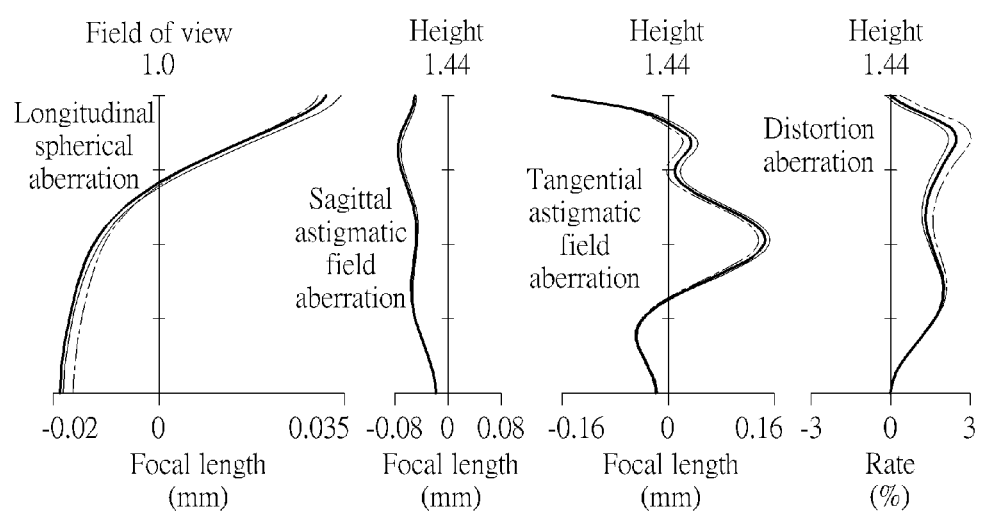
FIG. 19A illustrates the longitudinal spherical aberration on the image plane of the seventh example.
FIG. 19B illustrates the astigmatic aberration on the sagittal direction of the seventh example.
FIG. 19C illustrates the astigmatic aberration on the tangential direction of the seventh example.
FIG. 19D illustrates the distortion aberration of the seventh example.

Please refer to FIG. 18 which illustrates the seventh example of the optical imaging lens set 1 of the present invention. Please refer to FIG. 19A for the longitudinal spherical aberration on the image plane 71 of the seventh example; please refer to FIG. 19B for the astigmatic aberration on the sagittal direction; please refer to FIG. 19C for the astigmatic aberration on the tangential direction, and please refer to FIG. 19D for the distortion aberration. The components in the seventh example are similar to those in the first example, but the optical data such as the curvature radius, the refractive power, the lens thickness, the lens focal length, the aspheric surface or the back focal length in this example are different from the optical data in the first example. The optical data of the seventh example of the optical imaging lens set are shown in FIG. 38 while the aspheric surface data are shown in FIG. 39. The length of the optical imaging lens set is 3.10 mm. HFOV is 46 degrees, and the image height is 1.44 mm. Some important ratios of the fifth example are shown in FIG. 44.

It is worth noting, compared with the first example, this example has some advantages such as having shorter total length, having better imaging quality, being easier to produce and having higher yield.

EIGHTH EXAMPLE

Figure 20:
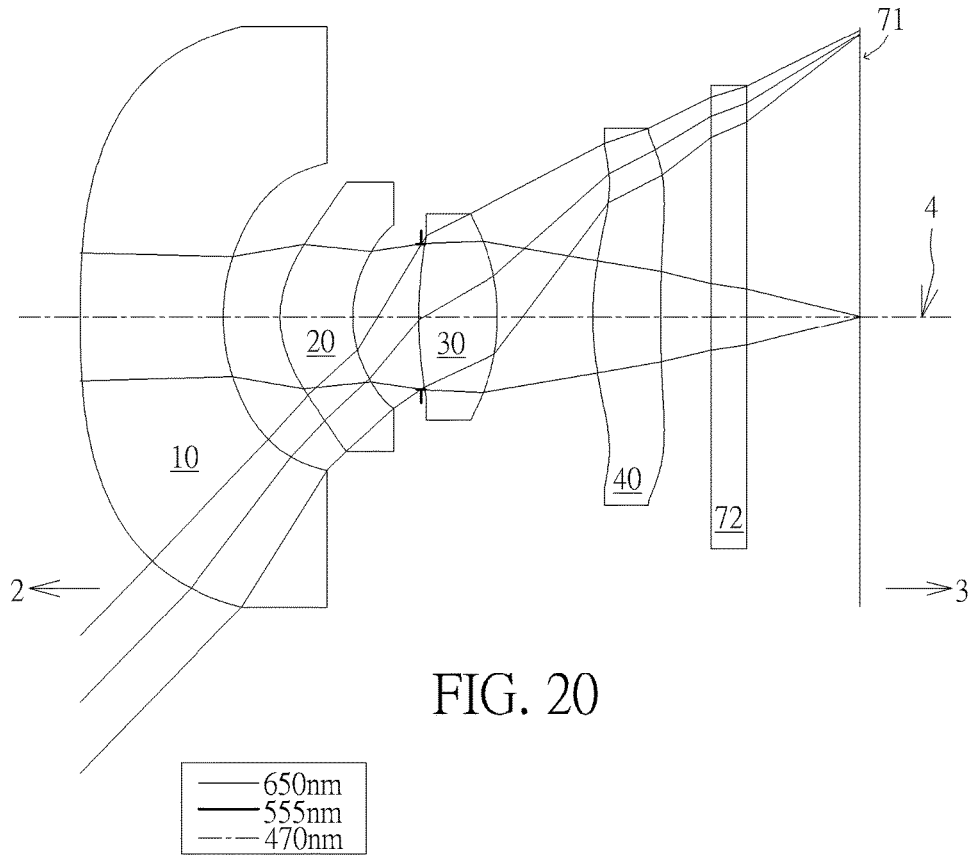
FIG. 20 illustrates an eighth example of the optical imaging lens set of four lens elements of the present invention.
Figures 21A, 21B, 21C, 21D:
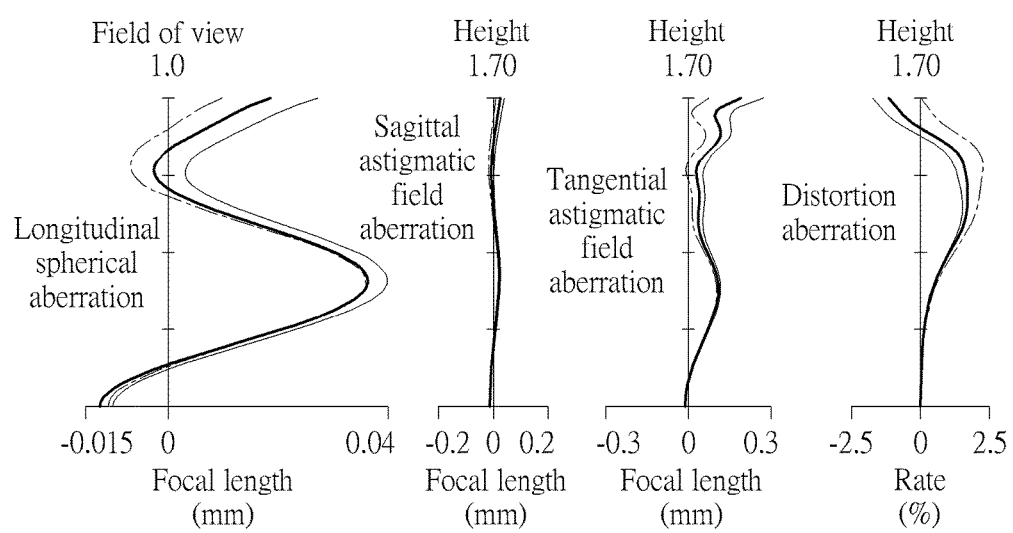
FIG. 21A illustrates the longitudinal spherical aberration on the image plane of the eighth example.
FIG. 21B illustrates the astigmatic aberration on the sagittal direction of the eighth example.
FIG. 21C illustrates the astigmatic aberration on the tangential direction of the eighth example.
FIG. 21D illustrates the distortion aberration of the eighth example.

Please refer to FIG. 20 which illustrates the eighth example of the optical imaging lens set 1 of the present invention. Please refer to FIG. 21A for the longitudinal spherical aberration on the image plane 71 of the eighth example; please refer to FIG. 21B for the astigmatic aberration on the sagittal direction; please refer to FIG. 21C for the astigmatic aberration on the tangential direction, and please refer to FIG. 21D for the distortion aberration. The components in the eighth example are similar to those in the first example, but the optical data such as the curvature radius, the refractive power, the lens thickness, the lens focal length, the aspheric surface or the back focal length in this example are different from the optical data in the first example. The optical data of the eighth example of the optical imaging lens set are shown in FIG. 40 while the aspheric surface data are shown in FIG. 41. The length of the optical imaging lens set is 4.64 mm. HFOV is 46 degrees, and the image height is 1.70 mm. Some important ratios of the fifth example are shown in FIG. 44.

It is worth noting, compared with the first example, this example has some advantages such as having better imaging quality, being easier to produce and having higher yield.

NINTH EXAMPLE

Figure 22:
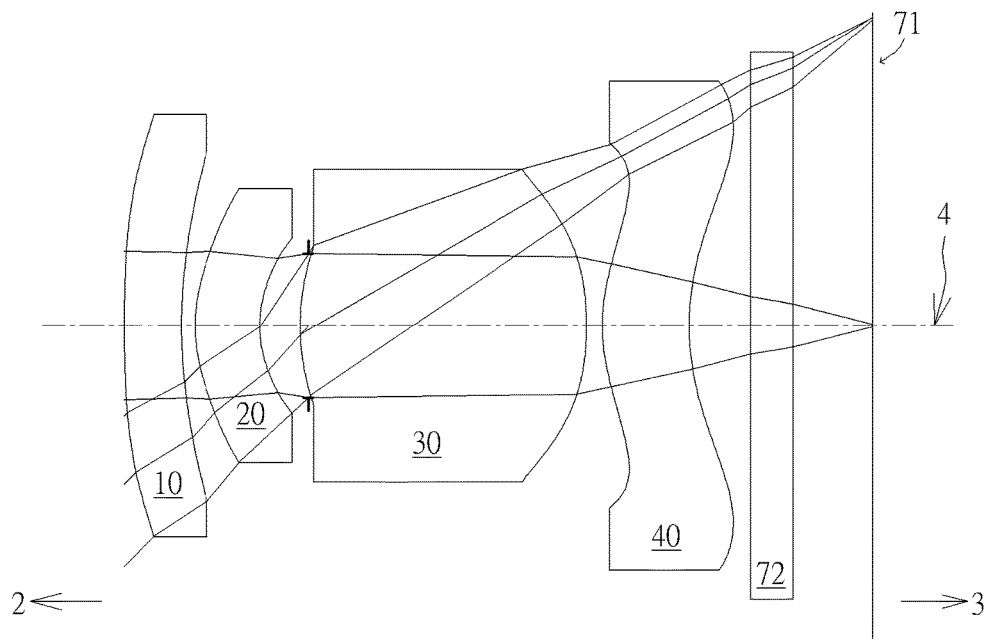
FIG. 22 illustrates an ninth example of the optical imaging lens set of four lens elements of the present invention.
Figures 23A, 23B, 23C, 23D:
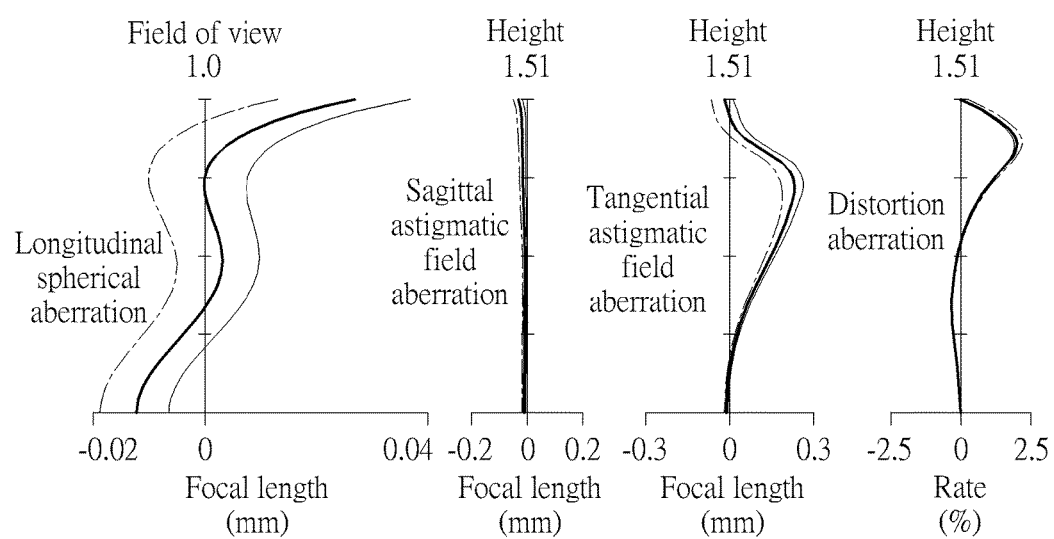
FIG. 23A illustrates the longitudinal spherical aberration on the image plane of the ninth example.
FIG. 23B illustrates the astigmatic aberration on the sagittal direction of the ninth example.
FIG. 23C illustrates the astigmatic aberration on the tangential direction of the ninth example.
FIG. 23D illustrates the distortion aberration of the ninth example.

Please refer to FIG. 22 which illustrates the ninth example of the optical imaging lens set 1 of the present invention. Please refer to FIG. 23A for the longitudinal spherical aberration on the image plane 71 of the ninth example; please refer to FIG. 23B for the astigmatic aberration on the sagittal direction; please refer to FIG. 23C for the astigmatic aberration on the tangential direction, and please refer to FIG. 23D for the distortion aberration. The components in the ninth example are similar to those in the first example, but the optical data such as the curvature radius, the refractive power, the lens thickness, the lens focal length, the aspheric surface or the back focal length in this example are different from the optical data in the first example, and in this example, the second lens element 20 has negative refractive power. The optical data of the ninth example of the optical imaging lens set are shown in FIG. 42 while the aspheric surface data are shown in FIG. 43. The length of the optical imaging lens set is 3.67 mm. HFOV is 46 degrees, and the image height is 1.51 mm. Some important ratios of the fifth example are shown in FIG. 44.

It is worth noting, compared with the first example, this example has some advantages such as having shorter total length, having better imaging quality, being easier to produce and having higher yield.

Following is the definitions of each parameter mentioned above and some other parameters which are not disclosed in the examples of the present invention, shown as TABLE 1:

TABLE 1

| Parameter | Definition |
|---|---|
| T1 | The thickness of the first lens element along the optical axis |
| G12 | The distance between the first lens element and the second lens element along the optical axis |
| T2 | The thickness of the second lens element along the optical axis |
| G23 | The distance between the second lens element and the third lens element along the optical axis |
| T3 | The thickness of the third lens element along the optical axis |
| G34 | The distance between the third lens element and the fourth lens element along the optical axis |
| T4 | The thickness of the fourth lens element along the optical axis |
| G4F | The distance between the fourth image-side surface of the fourth lens element to the filter along the optical axis |
| TF | The thickness of the filter along the optical axis |
| GFP | The distance between the filter to the image plane along the optical axis |
| f1 | The focal length of the first lens element |
| f2 | The focal length of the second lens element |
| f3 | The focal length of the third lens element |
| f4 | The focal length of the fourth lens element |
| n1 | The refractive index of the first lens element |
| n2 | The refractive index of the second lens element |
| n3 | The refractive index of the third lens element |
| n4 | The refractive index of the fourth lens element |
| υ1 | The Abbe number of the first lens element |
| υ2 | The Abbe number of the second lens element |
| υ3 | The Abbe number of the third lens element |
| υ4 | The Abbe number of the fourth lens element |
| EFL | The effective focal length of the optical imaging lens set |

TABLE 1-continued

| Parameter | Definition |
|---|---|
| TTL | The distance between the first object-side surface of the first lens element to the image plane |
| ALT | The total thickness of all the lens elements in the optical imaging lens set along the optical axis |
| AAG | The sum of total three air gaps between adjacent lens elements from the first lens element to the fourth lens element along the optical axis |
| BFL | The distance between the image-side surface of the fourth lens element to the image plane along the optical axis |

The applicant summarized the efficacy of each embodiment mentioned above as follows:

In the present invention, all of the longitudinal spherical aberration, the astigmatism aberration and the distortion are in compliance with the usage standard. In addition, the off-axis light of red, blue and green wavelengths are focused on the vicinity of the imaging point in different heights, therefore the deviation between each off-axis light and the imaging point is well controlled, so as to have good suppression for spherical aberration, aberration and distortion. Furthermore, the curves of red, blue and green wavelengths are very close to each other, meaning that the dispersion on the axis has greatly improved too. In summary, the different lens elements of the present invention are matched to each other, to achieve good image quality.

In addition, the inventors discover that there are some better ratio ranges for different data according to the above various important ratios, which are shown as follows. Better ratio ranges help the designers to design the better optical performance and an effectively reduced length of a practically possible optical imaging lens set.

1. If the optical imaging lens set satisfies the following relationships: |υ1−υ2|≥20, the optical imaging lens set will have a better arrangement and good image performance, and further have smaller volume.

2. If the optical imaging lens set satisfies one of the following relationships: EFL/BFL≤2.35; TTL/AAG≤13.94; TTL/G12≤89.82; TTL/T2≤32.35; ALT/G23≤47.81; TTL/G23≤71.93; ALT/G34≤40.80; TTL/G34≤61.66; TTL/T1≤17.06; ALT/T2≤20.82; TTL/T3≤12.87; TTL/T4≤21.49; TTL/BFL≤5.77; |υ2−υ3|≤10; ALT/AAG≤9.22; T3/T4≤4.34, the total length of the optical imaging lens set can be shrunk effectively. If further satisfying one of the following relationships: 0.60≤EFL/BFL≤2.35; 2.50≤TTL/AAG≤13.94; 9.60≤TTL/G12≤89.82; 2.12≤TTL/T2≤32.35; 3.84≤ALT/G23≤47.81; 8.27≤TTL/G23≤71.93; 2.66≤ALT/G34≤40.80; 5.72≤TTL/G34≤61.66; 2.11≤TTL/T1≤17.06; 1.41≤ALT/T2≤20.82; 1.83≤TTL/T3≤12.87; 2.52≤TTL/T4≤21.49; 1.74≤TTL/BFL≤5.77; 1.16≤ALT/AAG≤9.22; 0.48≤T3/T4≤4.34, the optical imaging lens set will have better imaging quality.

It is worth noting that, in view of the unpredictability of the optical system design, under the structure of the invention, controlling the parameters can help the designer to design the optical imaging lens set with good optical performance, having shorter total length, and being feasible in manufacturing process. Each parameter has its preferred range.

Figure 24:
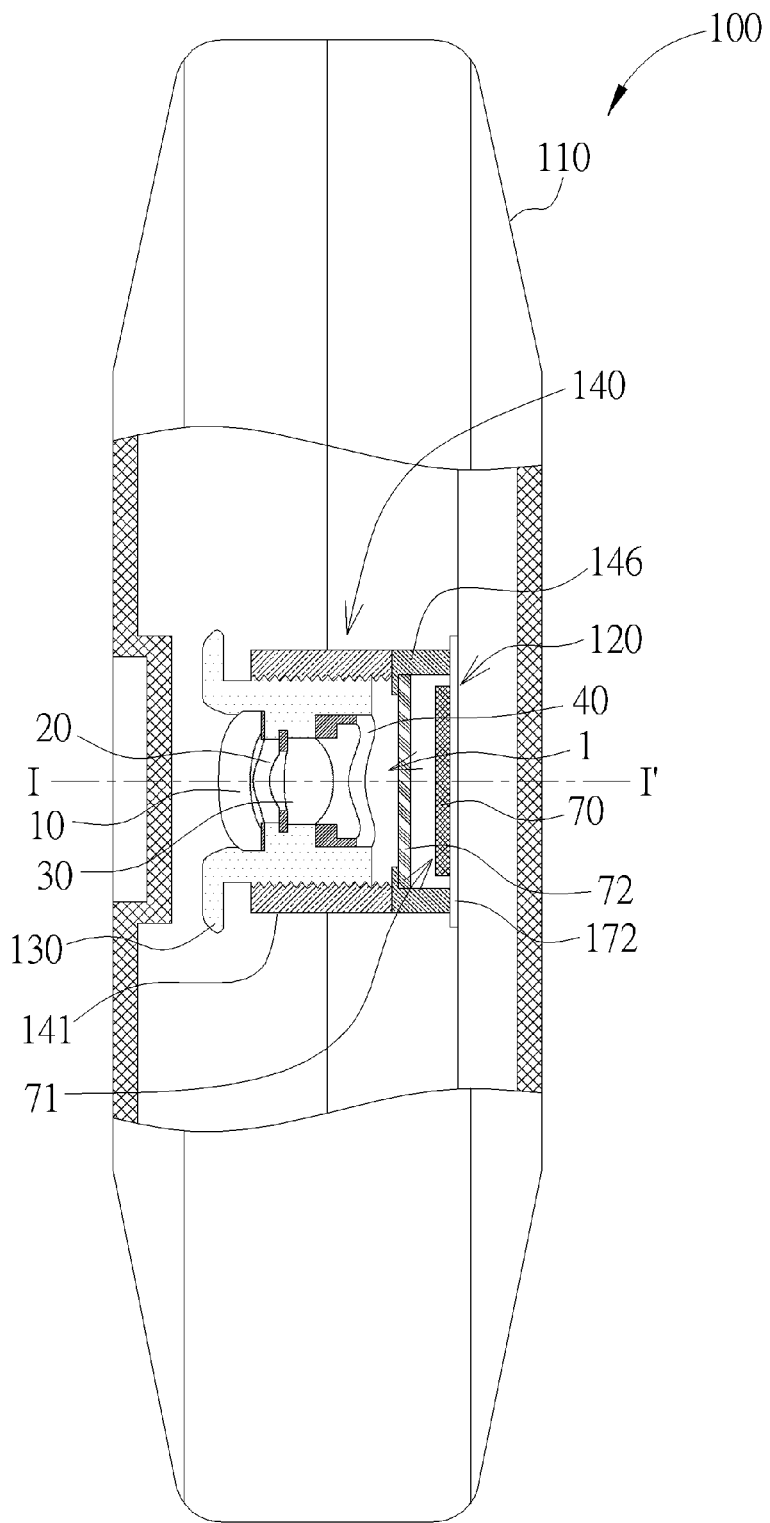
FIG. 24 illustrates a first preferred example of the portable electronic device with an optical imaging lens set of the present invention.

The optical imaging lens set 1 of the present invention may be applied to an electronic device, such as mobile phones, game consoles or driving recorders. Please refer to FIG. 24. FIG. 24 illustrates a first preferred example of the optical imaging lens set 1 of the present invention for use in a portable electronic device 100. The electronic device 100 includes a case 110, and an image module 120 mounted in the case 110. A mobile phone is illustrated in FIG. 24 as an example, but the electronic device 100 is not limited to a mobile phone.

As shown in FIG. 24, the image module 120 includes the optical imaging lens set 1 as described above. FIG. 24 illustrates the aforementioned first example of the optical imaging lens set 1. In addition, the portable electronic device 100 also contains a barrel 130 for the installation of the optical imaging lens set 1, a module housing unit 140 for the installation of the barrel 130, a substrate 172 for the installation of the module housing unit 140 and an image sensor 70 disposed at the substrate 172, and at the image side 3 of the optical imaging lens set 1. The image sensor 70 in the optical imaging lens set 1 may be an electronic photosensitive element, such as a charge coupled device or a complementary metal oxide semiconductor element. The image plane 71 forms at the image sensor 70.

The image sensor 70 used here is a product of chip on board (COB) package rather than a product of the conventional chip scale package (CSP) so it is directly attached to the substrate 172, and protective glass is not needed in front of the image sensor 70 in the optical imaging lens set 1, but the present invention is not limited to this.

To be noticed in particular, the case 110, the barrel 130, and/or the module housing unit 140 may be a single element or consist of a plurality of elements, but the present invention is not limited to this.

Each one of the four lens elements 10, 20, 30 and 40 with refractive power is installed in the barrel 130 with air gaps disposed between two adjacent lens elements in an exemplary way. The module housing unit 140 has a lens element housing 141, and an image sensor housing 146 installed between the lens element housing 141 and the image sensor 70. However in other examples, the image sensor housing 146 is optional. The barrel 130 is installed coaxially along with the lens element housing 141 along the axis I-I', and the barrel 130 is provided inside of the lens element housing 141.

Figure 25:
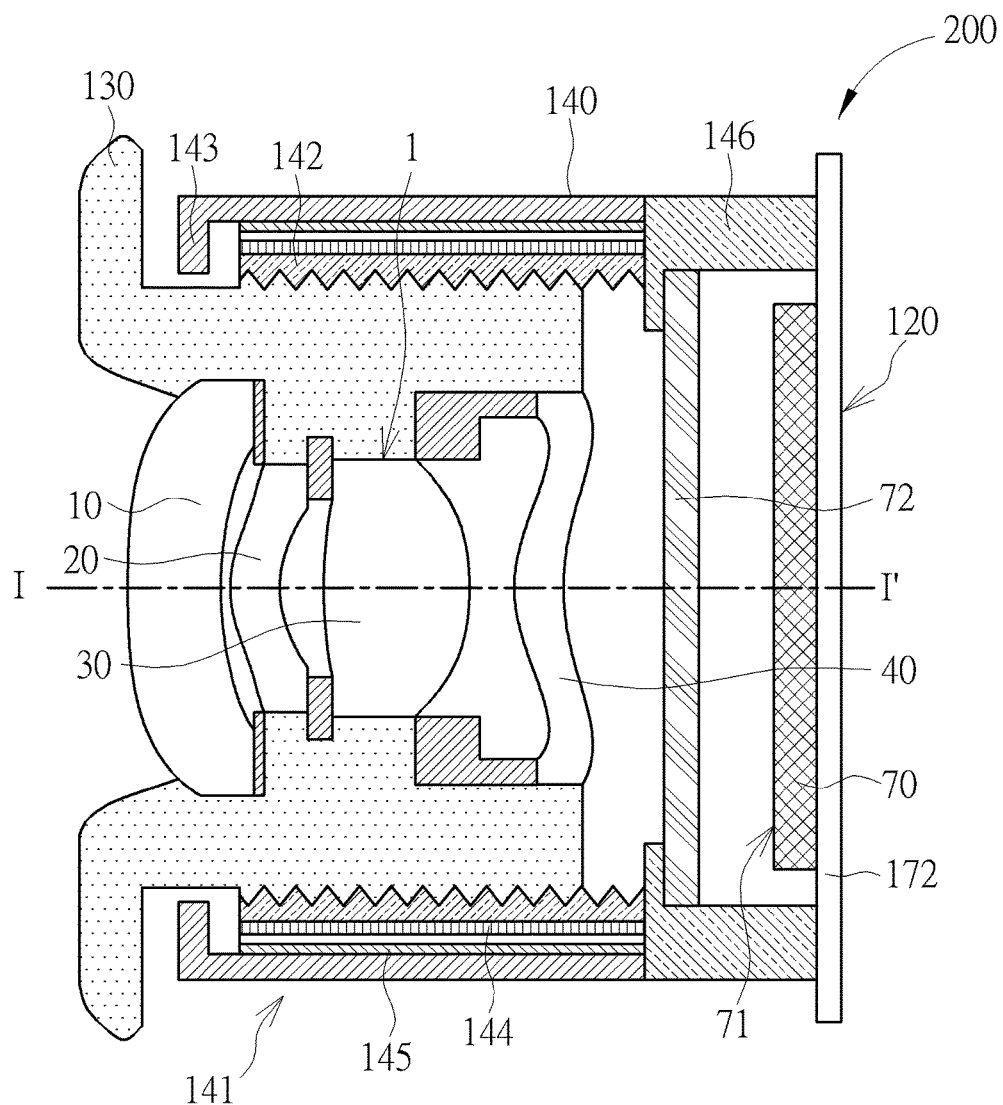
FIG. 25 illustrates a second preferred example of the portable electronic device with an optical imaging lens set of the present invention.

Please also refer to FIG. 25 for another application of the aforementioned optical imaging lens set 1 in a portable electronic device 200 in the second preferred example. The main differences between the portable electronic device 200 in the second preferred example and the portable electronic device 100 in the first preferred example are: the lens element housing 141 has a first seat element 142, a second seat element 143, a coil 144 and a magnetic component 145. The first seat element 142 is for the installation of the barrel 130, exteriorly attached to the barrel 130 and disposed along the axis I-I'. The second seat element 143 is disposed along the axis I-I' and surrounds the exterior of the first seat element 142. The coil 144 is provided between the outside of the first seat element 142 and the inside of the second seat element 143. The magnetic component 145 is disposed between the outside of the coil 144 and the inside of the second seat element 143.

The first seat element 142 may pull the barrel 130 and the optical imaging lens set 1 which is disposed inside of the barrel 130 to move along the axis I-I', namely the optical axis 4 in FIG. 6. The image sensor housing 146 is attached to the second seat element 143. Other details of the portable electronic device 200 in the second preferred example are similar to those of the portable electronic device 100 in the first preferred example so they are not elaborated again.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical imaging lens set, from an object side toward an image side in order along an optical axis comprising: a first lens element, a second lens element, a third lens element and a fourth lens element, said first to fourth lens elements having an object-side surface facing toward the object side as well as an image-side surface facing toward the image side, wherein:
said first lens element has negative refractive power;
said second lens element has an image-side surface with a concave part in a vicinity of the optical axis;
said third lens element has positive refractive power, and has an object-side surface with a convex part in a vicinity of the optical axis;
said fourth lens element has an image-side surface with a concave part in a vicinity of the optical axis; and
wherein the optical imaging lens set does not include any lens element with refractive power other than said first, second, third and fourth lens elements, in addition, a thickness T1 of said first lens element along said optical axis, and a distance TTL between said object-side surface of said first lens element to an image plane satisfy a relationship $TTL/T1 \leq 17.06$.

2. The optical imaging lens set of claim 1, wherein an effective focal length EFL of the optical imaging lens set, and a distance BFL between the image-side surface of said fourth lens element to an image plane satisfy a relationship $EFL/BFL \leq 2.35$.

3. The optical imaging lens set of claim 2, wherein a sum of all three air gaps AAG between each lens element from said first lens element to said fourth lens element along the optical axis satisfies a relationship $TTL/AAG \leq 13.94$.

4. The optical imaging lens set of claim 1, further comprising an aperture stop disposed between said second lens element and said third lens element.

5. The optical imaging lens set of claim 4, wherein an air gap G12 between said first lens element and said second lens element along said optical axis satisfies a relationship $TTL/G12 \leq 89.82$.

6. The optical imaging lens set of claim 1, wherein a thickness T2 of said second lens element along said optical axis satisfies a relationship $TTL/T2 \leq 32.35$.

7. The optical imaging lens set of claim 6, wherein a total thickness ALT of said first lens element, said second lens element, said third lens element and said fourth lens element along said optical axis, and an air gap G23 between said second lens element and said third lens element along said optical axis satisfy a relationship $ALT/G23 \leq 47.81$.

8. The optical imaging lens set of claim 1, wherein an air gap G23 between said second lens element and said third lens element along said optical axis satisfies a relationship $TTL/G23 \leq 71.93$.

9. The optical imaging lens set of claim 8, wherein a total thickness ALT of said first lens element, said second lens element, said third lens element and said fourth lens element along said optical axis, and an air gap G34 between said third lens element and said fourth lens element along said optical axis satisfy a relationship $ALT/G34 \leq 40.80$.

10. The optical imaging lens set of claim 1, wherein an air gap G34 between said third lens element and said fourth lens element along said optical axis satisfies a relationship $TTL/G34 \leq 61.66$.

11. The optical imaging lens set of claim 1, wherein a total thickness ALT of said first lens element, said second lens element, said third lens element and said fourth lens element along said optical axis, and a thickness T2 of said second lens element along said optical axis satisfy a relationship ALT/T2≤20.82.

12. The optical imaging lens set of claim 11, wherein a thickness T3 of said third lens element along said optical axis satisfies a relationship TTL/T3≤12.87.

13. The optical imaging lens set of claim 1, wherein a thickness T4 of said fourth lens element along said optical axis satisfies a relationship TTL/T4≤21.49.

14. The optical imaging lens set of claim 1, wherein a distance BFL between the image-side surface of said fourth lens element to an image plane satisfies a relationship TTL/BFL≤5.77.

15. The optical imaging lens set of claim 14, wherein an Abbe number v2 of said second lens element, and an Abbe number v3 of said third lens element satisfy a relationship |v2−v3|≤10.

16. The optical imaging lens set of claim 1, wherein a total thickness ALT of said first lens element, said second lens element, said third lens element and said fourth lens element along said optical axis, and a sum of all three air gaps AAG between each lens element from said first lens element to said fourth lens element along the optical axis satisfy a relationship ALT/AAG≤9.22.

17. The optical imaging lens set of claim 16, wherein a thickness T3 of said third lens element along said optical axis, and a thickness T4 of said fourth lens element along said optical axis satisfy a relationship T3/T4≤4.34.

18. An electronic device, comprising:
a case; and
an image module disposed in said case and comprising:
an optical imaging lens set of claim 1;
a barrel for an installation of said optical imaging lens set;
a module housing unit for an installation of said barrel;
a substrate for an installation of said module housing unit; and
an image sensor disposed on the substrate and disposed at an image side of said optical imaging lens set.

* * * * *